US006021306A

United States Patent [19]
McTaggart

[11] Patent Number: 6,021,306
[45] Date of Patent: Feb. 1, 2000

[54] APPARATUS FOR PRESENTING VISUAL MATERIAL WITH IDENTIFIED SENSORY MATERIAL

[75] Inventor: Stephen I. McTaggart, Mesa, Ariz.

[73] Assignee: Futech Interactive Products, Inc., Phoenix, Ariz.

[21] Appl. No.: 08/898,056

[22] Filed: Jul. 22, 1997

Related U.S. Application Data

[60] Continuation of application No. 08/474,707, Jun. 7, 1995, abandoned, which is a division of application No. 07/980,649, Nov. 24, 1992, Pat. No. 5,484,292, which is a continuation-in-part of application No. 07/685,278, Apr. 15, 1991, Pat. No. 5,167,508, which is a continuation-in-part of application No. 07/396,129, Aug. 21, 1989, abandoned.

[51] Int. Cl.⁷ .................................................. G09B 5/00
[52] U.S. Cl. ........................... 434/317; 434/308; 434/309
[58] Field of Search ................................. 434/156, 178, 434/169, 308, 309, 311, 317, 339; 200/5 R, 5 A

[56] References Cited

U.S. PATENT DOCUMENTS

| Re. 28,199 | 10/1974 | Deb et al. . |
|---|---|---|
| 1,475,430 | 11/1923 | Curwin . |
| 1,545,217 | 7/1925 | Thurber . |
| 1,670,254 | 5/1928 | Gowin . |
| 2,277,318 | 3/1942 | Grant . |
| 2,444,355 | 6/1948 | Kniznick . |
| 2,524,143 | 10/1950 | Smith . |
| 2,826,844 | 3/1958 | Leika . |
| 2,997,306 | 8/1961 | Hicks . |
| 3,086,297 | 4/1963 | Kantrowitz . |
| 3,096,271 | 7/1963 | Hespenheide . |
| 3,220,126 | 11/1965 | Gabrielsen . |
| 3,529,832 | 9/1970 | Goetz et al. . |
| 3,540,132 | 11/1970 | Glass et al. . |
| 3,553,851 | 1/1971 | Paige . |
| 3,592,098 | 7/1971 | Zadig . |

(List continued on next page.)

FOREIGN PATENT DOCUMENTS

| 60-22363 | 2/1985 | Japan . |
|---|---|---|
| 61-6797 | 2/1986 | Japan . |
| 63-8100 | 1/1988 | Japan . |
| 63-96898 | 6/1988 | Japan . |
| WO81/02215 | 8/1981 | WIPO . |

*Primary Examiner*—Glenn E. Richman
*Attorney, Agent, or Firm*—Quarles & Brady LLP

[57] ABSTRACT

An electronic book comprising a plurality of leaves, each leaf comprising pages of printed material bound at one edge to form a spine, with electrical circuits formed in each leaf. A common electronic circuit such as a speech generator and/or controller cooperates with the electrical circuits on each of the various pages, connected to the electrical circuits in the leaves through conductive paths through the spine of the book. The electrical circuits in the leaves include electrical elements such as switches, and sensory output devices (e.g., thermochromic devices, light emitting diodes, thermo-olfactory devices, electrochromic devices, and the like). The electrical elements are associated with particular portions of the printed material so that the particular portions can be selectively highlighted or emphasized (e.g., designated by actuation of a visual or olfactory device and/or text read). A particularly advantageous switch structure formed integral to the page employing standard printing techniques, the bonding of LEDs directly into the printed circuit, and various advantageous methods of construction of the book are also disclosed.

18 Claims, 10 Drawing Sheets

U.S. PATENT DOCUMENTS

| | | |
|---|---|---|
| 3,648,387 | 3/1972 | Lahr . |
| 3,738,021 | 6/1973 | Hino et al. . |
| 3,798,806 | 3/1974 | Sanford . |
| 3,803,580 | 4/1974 | Shattuck . |
| 4,021,932 | 5/1977 | Lipps . |
| 4,055,014 | 10/1977 | Schmidt et al. . |
| 4,102,067 | 7/1978 | Tarrant . |
| 4,158,264 | 6/1979 | Orth . |
| 4,189,852 | 2/1980 | Chatlien . |
| 4,209,824 | 6/1980 | Kaufman . |
| 4,222,188 | 9/1980 | Tarrant et al. . |
| 4,236,156 | 11/1980 | Eden . |
| 4,273,538 | 6/1981 | Ross . |
| 4,286,399 | 9/1981 | Funahashi et al. . |
| 4,299,041 | 11/1981 | Wilson . |
| 4,310,318 | 1/1982 | Carlson . |
| 4,343,474 | 8/1982 | Caney . |
| 4,363,081 | 12/1982 | Wilbur . |
| 4,425,098 | 1/1984 | Döring . |
| 4,497,126 | 2/1985 | Dejean . |
| 4,531,310 | 7/1985 | Acson et al. . |
| 4,636,881 | 1/1987 | Brefka et al. . |
| 4,656,469 | 4/1987 | Oliver et al. . |
| 4,703,573 | 11/1987 | Montgomery et al. . |
| 4,706,536 | 11/1987 | Sanders . |
| 4,733,127 | 3/1988 | Takasu et al. . |
| 4,752,230 | 6/1988 | Shimizu . |
| 4,778,391 | 10/1988 | Weiner . |
| 4,809,246 | 2/1989 | Jeng . |
| 4,990,092 | 2/1991 | Cummings . |
| 5,167,508 | 12/1992 | McTaggart . |
| 5,190,285 | 3/1993 | Levy et al. . |
| 5,374,195 | 12/1994 | McClanahan . |
| 5,417,575 | 5/1995 | McTaggart . |
| 5,484,292 | 1/1996 | McTaggart . |
| 5,538,430 | 7/1996 | Smith ...... 434/178 |
| 5,807,176 | 9/1998 | Forsse et al. ...... 434/317 |
| 5,810,604 | 9/1998 | Kopp ...... 434/317 |

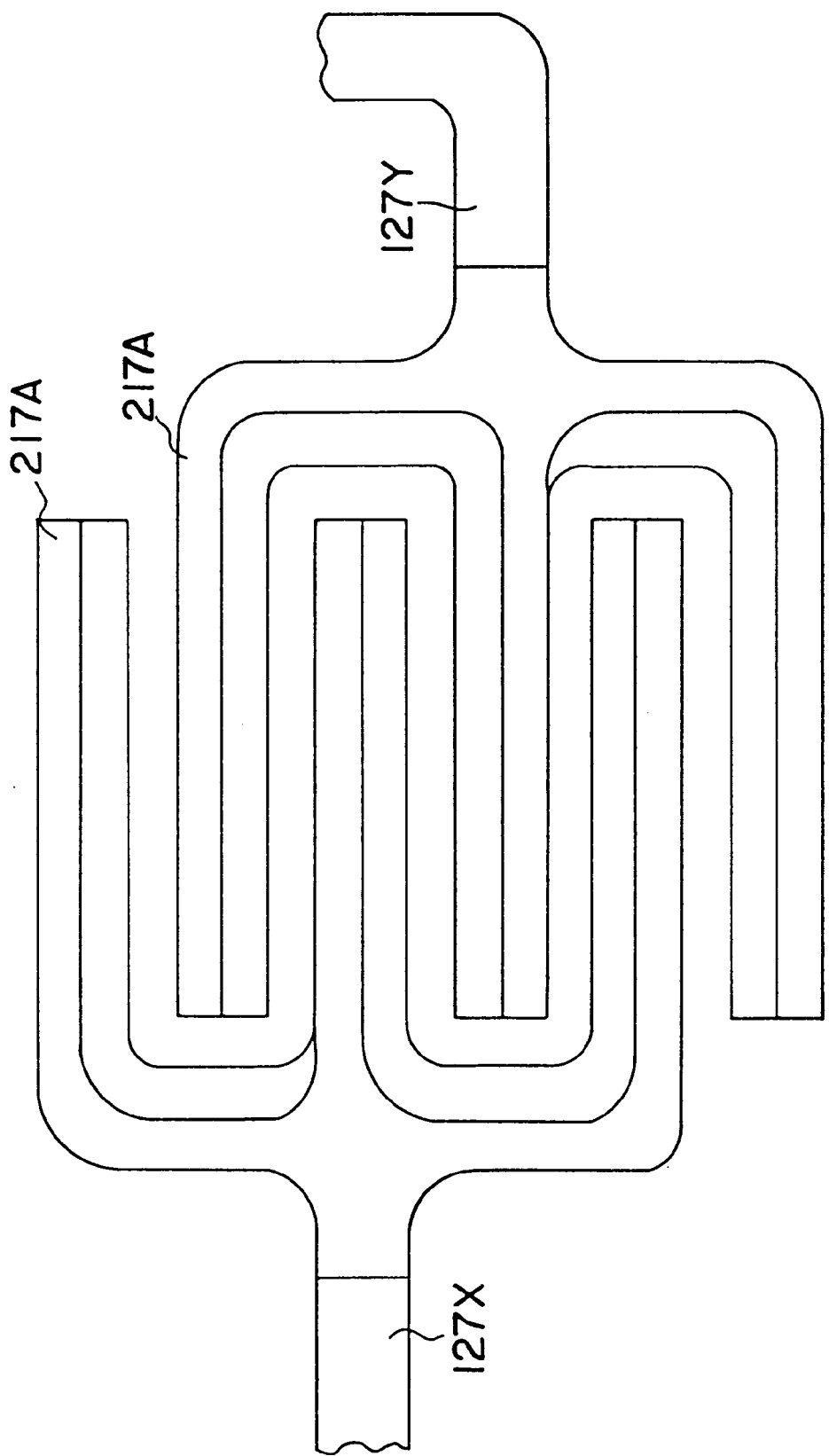

APPARATUS FOR PRESENTING VISUAL MATERIAL WITH IDENTIFIED SENSORY MATERIAL

RELATED APPLICATIONS

This is a continuation of U.S. patent application Ser. No. 08/474,707 filed on Jun. 7, 1995 now abandoned, which is a divisional of U.S. patent application Ser. No. 07/980,649 filed on Nov. 24, 1992, U.S. Pat. No. 5,484,292, which is a continuation-in-part of U.S. application Ser. No. 07/685,278, U.S. Pat. No. 5,167,508 filed by the same inventor on Apr. 15, 1991, currently co-pending, which is a continuation-in-part of U.S. application Ser. No. 07/396,129, filed by the same inventor on Aug. 21, 1989, now abandoned.

BACKGROUND OF THE INVENTION

1. Field of the Invention

This invention relates to the general field of apparatus and methods for combining audio and visual indicia of information. Specifically, the present invention relates to apparatus and methods for enhancing the comprehension and retention of information displayed in a book by combining audio and/or visual messages with the presentation of printed material.

2. Description of the Prior Art

Comprehension of printed matter is a high priority educational objective of modern society. It is known that comprehension of all printed material depends on the viewer's ability to interpret visually perceivable information in accordance with previously acquired knowledge associated with that information. Accordingly, various attempts have been made at producing aids to enhance the process of interpretation of such visually perceived information in order to improve its comprehension and assimilation.

Among the various devices found in prior art, U.S. Pat. Nos. 4,021,932 to Lipps (1977), No. 4,189,852 to Chatlien (1980), No. 4,273,538 to Ross (1981), No. 4,425,098 to Doring (1984), No. 4,752,230 to Shimizu (1988), No. 4,778,391 to Weiner (1988), and No. 4,809,246 to Jeng (1989) disclose several approaches utilized to provide effective highlighting of printed material, either for amusement purposes or for improving the comprehension and retention of a reader. U.S. Pat. No. 4,809,246 to Jeng, in particular, teaches a sound illustrated book that utilizes a page sensing element that triggers an audio recording of a description of the printed matter on the page being viewed.

In U.S. Pat. No. 4,703,573 (1987), Montgomery et al. disclose an electronic book apparatus with audio and visual components for electronically generating and transmitting a combination of sound and electronic images to identify the information displayed on an open sheet. Control circuitry is provided on the sheet to coordinate the functioning of the audio and visual displays according to a predetermined sequence considered appropriate to enhance understanding of the material. Similarly, U.S. Pat. No. 4,363,081 to Wilbur (1982) describes the use of light emitting diode (LED) components to highlight drawings and other printed matter in greeting cards.

In addition, U.S. Pat. No. 4,209,824 to Kauffman (1980) discloses a book comprising pages including electrical circuitry and apertures with light emitting devices in each page to illuminate areas of pictures printed on the page. U.S. Pat. No. 3,592,098 to Zadig (1971) teaches a flexible conductive ink which enables the sheet on which the ink is printed to be folded across the ink without breaking the ink circuit. In U.S. Pat. No. 1,545,217 (1925) and No. 1,670,254 (1928), Thurber and Gowin show the forming of conventional, non-electronic, books by folding a single sheet in accordion style. Finally, U.S. Pat. No. 2,277,318 (1942) and No. 2,444,355 (1948) to Grant and Kniznick illustrate the making of conventional books by folding a plurality of sheets in half and binding them at the folds to the spine of the book.

A review of the prior art shows that most devices developed to date merely present an audio description or lighting of printed matter illustrated on a page. Others appear to limit the audio and/or visual enhancement to just printed words or printed images. Most importantly, though, the various kinds of apparatus used in prior art are not practical for bound book format. Moreover, the approaches taught in prior art to control the functioning of both the audio and/or visual displays are specific to the requirements of each page; therefore, they are not suitable for voluminous multi-page applications. Finally, no existing electronic book utilizes visual and audio messages in interactive fashion with the reader to illustrate the printed material.

Therefore, there still exists a need for practical apparatus wherein visual information, presented in any character or image form on a page of a book (hereinafter referred to generally as visual matter, printed matter, material, or information), is explained, highlighted, or in any way enhanced by sound and/or light displays systematically synchronized with the information to stress its meaning and improve comprehension and retention on the part of a reader. In particular, there is a need for a compact method of manufacturing that is suitable for assembling many pages into a single bound book in an economical and practical manner.

SUMMARY OF THE INVENTION

The present invention provides an electronic book apparatus that produces audio and/or visual enhancement of printed information.

In accordance with one aspect of the present invention, visual signals are produced in conjunction with the display of the printed information in the book in order to highlight and draw attention to it.

In accordance with another aspect of the present invention, an audio signal, or message, is produced in conjunction with the display of the printed information in the book to describe and facilitate the reader's recognition and understanding of the material and to further highlight its presence on a page.

In accordance with yet another aspect of the present invention, synchronization between the audio and visual signals is provided in connection with any portion of the printed information to which they pertain, to clearly focus the attention of the viewer on the particular portion of interest and improve his or her comprehension of the material viewed.

In accordance with still another aspect of the present invention, synchronized audio and/or visual messages are delivered according to a predetermined schedule appropriately chosen for educational or entertainment purposes.

In accordance with another aspect of the present invention, an interactive system is provided whereby the reader of the book can chose between alternatives to best suit his or her interest, so that the reader's attention can be further stimulated by direct involvement in the viewing progression through the material in the book.

Another aspect of this invention provides a novel method of manufacture of an electronic book that permits the combination of visual and audible signal circuitry in compact format for use in voluminous publications. In one embodiment, the book consists of a continuous sheet of circuitry folded in accordion fashion and bound at one end to form leaves and corresponding pages. In the preferred embodiment, the circuitry corresponding to each pair of facing pages (spread) or, in the alternative, to each book leaf (opposite pages on one sheet) constitutes a module that is made functional by connection with control electronics in the head portion of the book through flexible printed circuitry in the spine of the book.

The present invention may be implemented in a variety of designs and physical embodiments to fit different implementation formats, as may be desired for different kinds of printed information. To that end, the apparatus described herein can be, if desired, implemented in modular form, wherein each page of a book constitutes a modular component of the overall apparatus.

In accordance with another aspect of the present invention, an apparatus is provided that is suitable for assembly in voluminous form and wherein the visual and/or audio display of each page can be controlled directly from a central control board and independently of the other pages.

A device in accordance with the present invention can be realized in an economical and commercially viable manner. This is done by utilizing simple components and methods of manufacture that are either already available in the open market or can be developed at competitive prices.

BRIEF DESCRIPTION OF THE DRAWING

Preferred exemplary embodiments of the present invention will hereinafter be described in conjunction with the appended drawings, wherein like designations denote like elements and:

FIG. 16C is a pictorial view of the contacts of a second embodiment of the switch in accordance with the present invention.

DETAILED DESCRIPTION OF THE INVENTION

Figure 1:
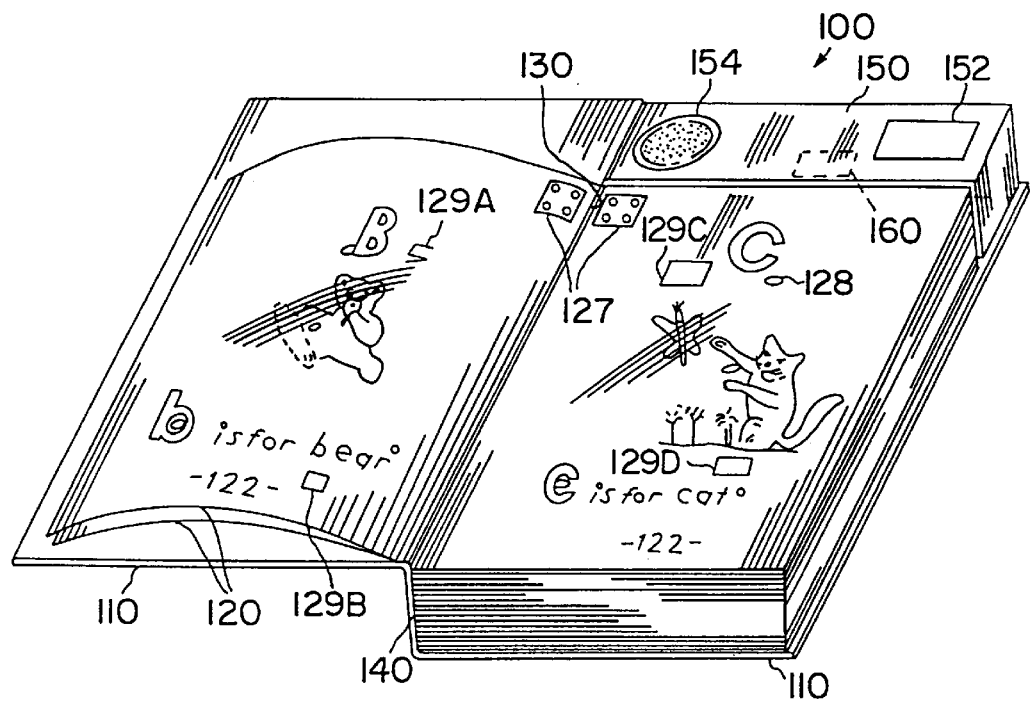
FIG. 1 is a perspective view of the general features of an embodiment of the electronic book, the present invention, and illustrating an open spread with alphabet letters and pictorial representations of related subject matter.

Referring now to FIG. 1, an electronic book 100 according to the present invention comprises a cover 110, a multiplicity of page leaves 120, a spine 140, a head portion 150, a battery compartment 152, a speaker 154, and electronic circuitry 160. Cover 110 suitably covers and binds page leaves 120 at an inside margin 130 to form spine 140. Head portion 150 is suitably affixed to cover 110 and preferably incorporates electronic control circuitry 160, battery compartment 152, and speaker 154.

Figure 2A:
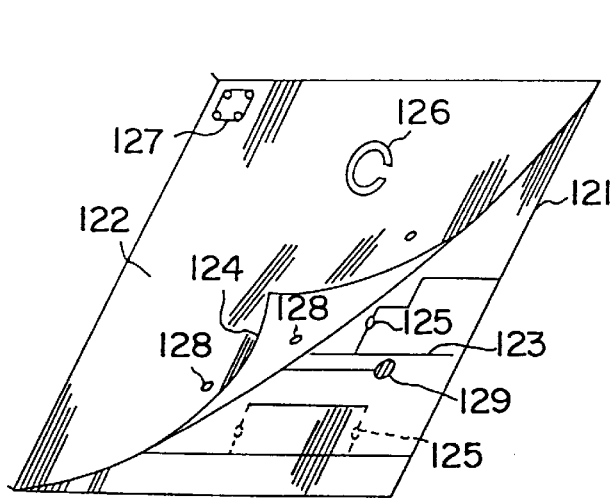
FIG. 2A illustrates a first embodiment of a book page exposing a circuit layer sandwiched between a top sheet bearing visual information and a substrate sheet according to one embodiment of the present invention.
Figure 2B:
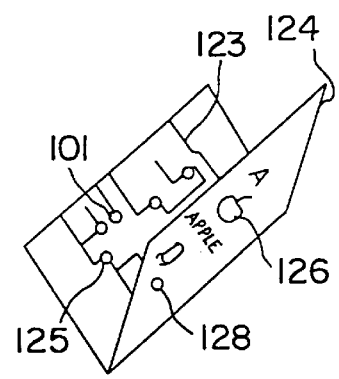
FIG. 2B illustrates leaf formed of two opposing book pages according to another embodiment of the present invention wherein a circuit is formed by conductive ink on the underside of a substrate sheet (interior of the leaf).
Figure 4:
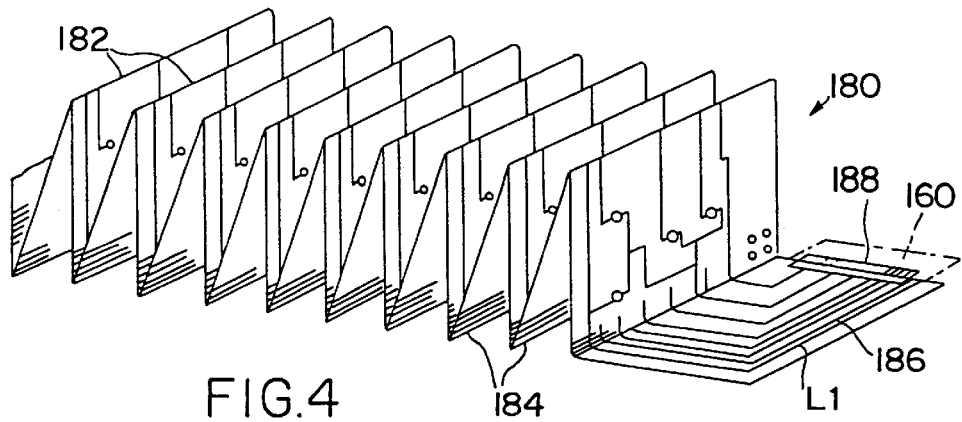
FIG. 4 is a perspective view of a continuous sheet used to form the leaves of the electronic book according to another embodiment of the invention.

Referring to FIGS. 2A, 2B and 4, the respective sides of leaves 120 form the pages 122 of book 100. As will hereinafter be more fully described, pages 122 suitably comprise a substrate 121 bearing visual material 126 and a circuit 123 (variously referred to a printed circuit 123, circuit layer 123 and circuit board layer 123). Visual material 126 is suitably in the form of printed images, alphanumeric characters, or other material suitable for affixation to a book page. Circuit 123 is suitably formed on one or both sides of substrate 121. Circuit 123 is preferably formed by printing in conductive ink, but can be formed by other conventional methods.

Circuit 123 suitably incorporates one or more electrical elements, such as, for example, switches (127, 129), active visual devices (125), heat element (resistor) and conductive terminal pads (101). For example, exposed conductive terminal pads 101 (FIG. 2B) can be formed, integral to circuit 123. Pads 101 are suitably accessible through an aperture, or formed (e.g., using conventional through hole techniques) on the print side of the leaf. Pads 101 are employed to provide an electrical connecter to an extrinsic item, such as a figurine, including, e.g., a speaker and/or active visual device. Similarly, the heat element can be used in conjunction with material that changes color (thermochromic) or releases scent (thermo-olfactory) when heated.

As illustrated in FIG. 2A, printed material 126 can be disposed on a separate top sheet 124, cooperating with substrate 121 to form a laminated assembly. If desired, top sheet 124 may include one or more transparent or translucent portions or apertures 128 disposed at predetermined positions on sheet 124. Active visual devices 125 (such as, for example, light emitting diodes (LEDs), or electrochromic or thermochromic devices) may be incorporated into circuit 123, disposed in registry with non-opaque (i.e., transparent, semi-transparent, or translucent) portions or apertures 128 in top sheet 124 for visual accessibility when the page 122 is assembled in its laminated form. Alternatively, top sheet 124 may comprise a non-opaque material, with visual material 126 printed by conventional reverse lay down processes on its underside (i.e., the side adjacent substrate 121) unprinted (bare) portions are provided to overlie the various visual display devices 125 in circuit 123. In such an embodiment, circuit 123 is suitably formed on the side of substrate 121 adjacent top sheet 124. The layout of the circuit 123 corresponding to the page determines the exact physical location on the page of the visual signals produced by the LEDs and visible through the non-opaque portions or apertures 128 in the top sheet 124 of that page. Of course, these locations may be the same or vary from page to page according to the specific requirements for the material being displayed. While not shown in FIG. 2A, the page on the back side of the laminated embodiment of leaf 120, is suitably of similar two-sheet laminated configuration.

As shown in FIG. 2B, page 122 can also be formed of a single (unitary) sheet bearing both the visual information (e.g., printed material) and with circuit 123, circuit 123 would be formed, suitably by printing in conductive ink, on the opposite side of the sheet or on the same side of the sheet with the printed material. For example, leaves 120 can be formed by printing visual materials on one side of substrate sheet 121 and forming (e.g., printing) conductive circuit 123 on the other, or by first forming (e.g., printing) circuit 123 on the substrate then overprinting with visual material 126.

Similarly, circuit 123 can be printed on one side of substrate 121 (or top sheet 124), and over-printed with the visual material 126.

Alternatively, where the substrate is non-opaque (e.g., transparent, semi-transparent, or translucent) material (e.g., a plastic, such as polyester Melinex, Mylar, or other synthetic materials specifically treated to facilitate multi-color printing processes), the visual material can be printed by conventional reverse lay down processes on the back of substrate 121, so that the visual material is viewed through substrate 121. Circuit 23 is then printed over the reverse laid down printing. If desired, an intermediate layer of "white-wash" can be printed over the reverse laid down printed material, and circuit 123 printed over the "white-wash". To accommodate visual devices 125, the reverse laid down printed matter (and white-wash, if used) define bare areas on substrate 121, corresponding to the desired dispositions of visual devices 125. As will hereinafter be more fully described, substrate 121 would be folded to place the printed matter and circuit 123 on the interior of the fold, with the other side (e.g., non-printed side) of substrate 121 facing outward on both sides. Such a structure is particularly desirable in books intended for young children; the respective inks and electrical devices are secure by virtue of their location on the interior of the folded structure.

Pages 122 each suitably include one or more switches (127, 129) associated with the page, or respective portions of or images on the page. For example, each page may include, if desired, a suitable switch mechanism 127 that is actuated when the book is opened to the corresponding page. Switch 127 may comprise photosensitive switch elements or phototransistors, pressure sensitive switches or electromechanical contact switch elements extending outwardly from the surface of the page, or the like. For example, with reference to FIG. 1, switches 127 may be formed of contact elements on the opposite pages a spread of adjacent pages (FIG. 1), so that an open circuit is created by separating the pages and separating adjacent components that otherwise form a normally closed switch assembly. The contacts of switch 127 are suitably formed using conventional through hole technology, where circuit 123 is disposed on the rear of the substrate.

In addition, or alternatively, each page 122 suitably includes one or more switches 129 (e.g., 129A–129D) associated with the page, or respective portions of the page in particular, images or characters on the page. Switches 129 are preferably momentary contact switches formed underlying printed indicia disposed at predetermined positions on the page, preferably in the vicinity of particular images, characters, words, or passages. As will hereinafter be explained, switches 129 may be formed, in accordance with one aspect of the present invention, employing conventional printing processes, using respective patterns of conductive, and nonconductive (e.g., dielectric) ink.

As will be explained, in accordance with one aspect of the present invention, the respective pages (leaves) are assembled such that the circuit 123 of each page is electrically connected to electronic circuit 160. Switch 129 (and/or 127) on the page electronically generates and transmits an identifying signal (such as an open or a closed circuit signal) through that page's conductive circuit 123 to the electronic circuitry 160.

Electronic circuitry 160 may be any circuit which, in response to actuation of switches 129 (and/or 127), generates a predetermined audio response and/or control signals to visual elements (e.g., LED 125) on pages 122 in accordance with the particular switch activated (and hence the corresponding visual material 126). Electronic circuitry 160 services all of the various pages of the book and, hence, is sometimes referred to herein as "common electronic circuitry" 160.

For example, in a book employing audio response only, circuit 160 may comprise one or more conventional data selector chips, such as a Hewlett Packard 74HP138 one of eight data selector IC, and a conventional integrated speech processor chip, such as a Texas Instrument TI TSP50C14 speech processor. The speech processor is programmed to generate signals corresponding to the desired speech or sounds, employing conventional techniques, for application to a conventional audio output device (e.g., speakers, headphones or the like).

Figure 3A:
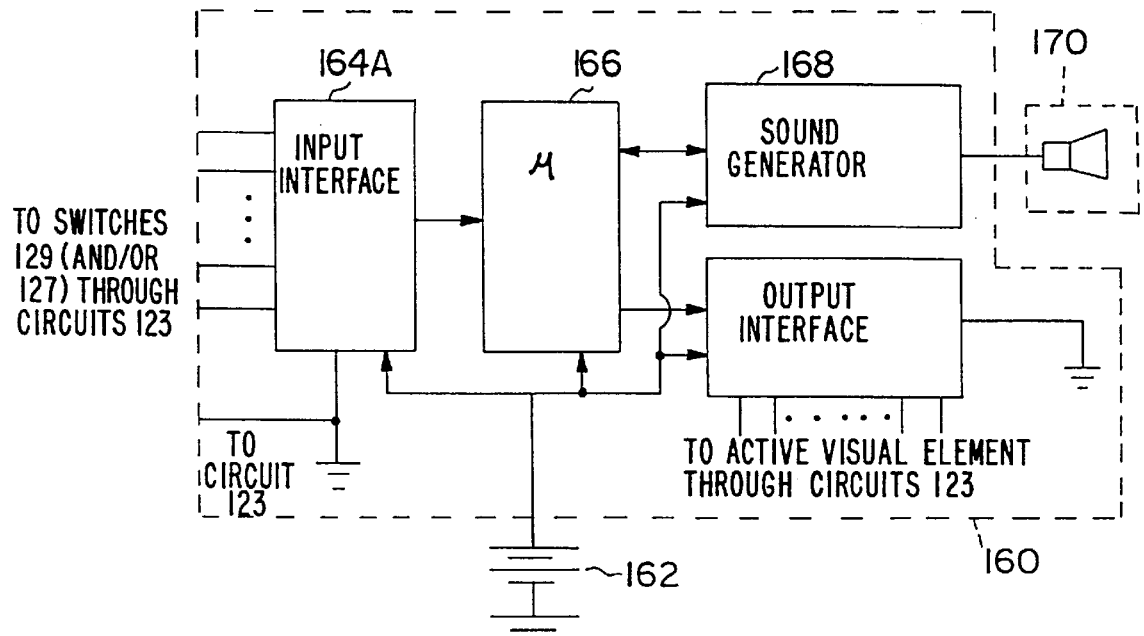
FIGS. 3A and 3B are block schematic diagrams of respective embodiments of the common electronic circuitry of the book of the present invention.

Alternatively, as shown in FIG. 3A, electronic circuit 160 may include a suitable data selector (interface) circuit (or circuits) 164A (e.g., conventional data selector chips), a conventional microprocessor 166, a conventional sound generator 168 (e.g., speech synthesis chip, digital recorder, or the like, with internal or external memory or storage media), and a suitable output interface circuit 164B (e.g., multiplexer, or decoder). Interface circuit 164A, connected, as will be explained, to switches 129 (and/or 127) through circuit 123, generates in accordance with conventional techniques, a signal to microprocessor 160, indicative of the particular switches 129 (and/or 127) which are activated (e.g., rendered conductive, rendered nonconductive or otherwise change state). Microprocessor 166 responsively generates control signals to sound generator 168 and/or output interface circuit 164B.

Microprocessor 166 is programmed, in accordance with techniques well known in the art, to generate a sequence of one or more control signals to sound generator 168 and/or output interface circuit 164B in response to actuation of particular individual switches 129 (and/or 127). The sequence of control signals can be predetermined, or randomly chosen. Preferably, a particular (generally unique) sequence of control signals is associated with each individual switch 129 (and/or 127), or the sequence is chosen from a specific group of predetermined sequences corresponding to the switch, either randomly or in accordance with a predetermined criteria (e.g., a count of the number of times the switch is actuated, or as a function of prior actuated switches). Sound generator 168 provides signals to a conventional audio output device 170 (e.g., speaker, headphones) to generate predetermined sounds or speech in accordance with the control signals provided by microprocessor 166. Interface circuit 164B suitably effects control (e.g., actuates, deactuates or causes a change of state) of one or more designated visual devices 125 in accordance with the control signals provided by microprocessor 166; e.g., completes a circuit between power source 162 and the designated device 125. Thus, in response to actuation of a particular switch 129 (or 127), electronic circuit 160 effects generation of sounds and/or speech, and/or control of visual elements 125.

Figure 3B:
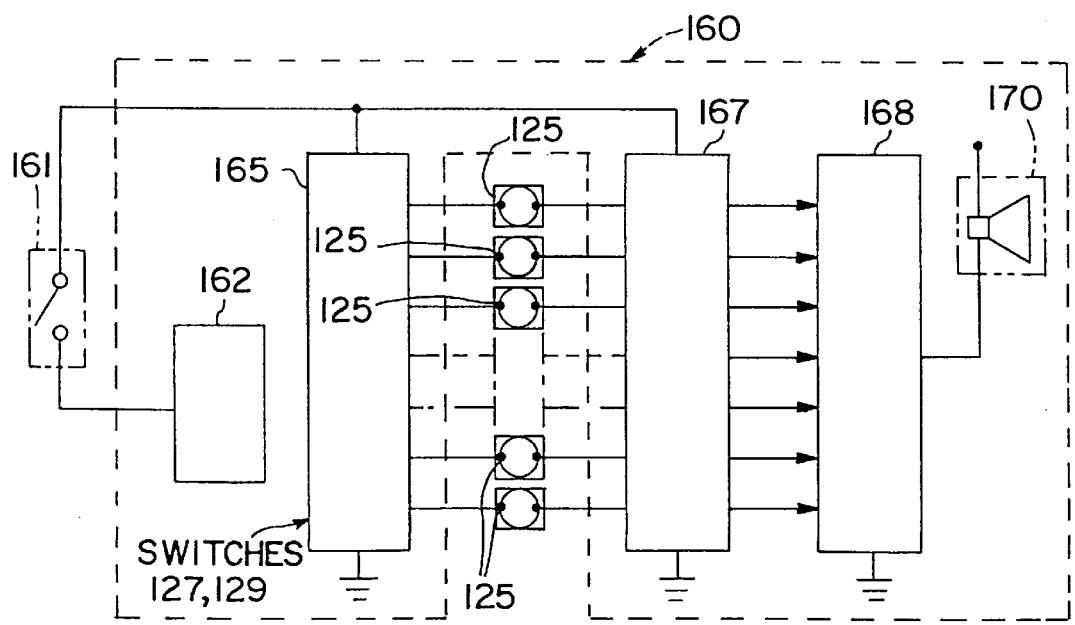

Referring to FIG. 3B circuitry 160 may, alternatively, comprise a sequencer 165 and synchronizer 167 in cooperation with an integrated speech synthesizer. Sequencer 165 and synchronizer 167 each suitably comprise 16-to-1 analog multiplexers such as sold by the Motorola Corporation of Chicago. An on/off switch 161 selectively provides power to the respective elements of circuit 160. Switches 127 and/or 129 are connected through the associated circuit 123 to one or both sequencer 165 and synchronizer 167, which cooperate to complete a circuit through one or more designated visual devices 125, and provide a control signal indicative of the actuated switch 127, 129 to sound generator 168. In practice, sequencer 165 and synchronizer 167 may be implemented in a single chip, such as a Signetics CD694067 decoder/multiplexer/expansion sequencer, cooperating with a sound generator 168 comprising a Texas Instruments TSP-50C-11 speech synthesizer and a 10 mHz synchronization crystal. The synthesizer is appropriately programmed employing conventional techniques.

Page switches 127 may be employed if desired to effect a sequence of visual and/or audio responses associated with the material presented on a set of pages (e.g., a spread of two adjacent pages as illustrated in FIG. 1). Switch 127 may effect the sequence automatically when book 100 is open to that set of pages (e.g., spread) or may be manually actuated.

In operation, in an exemplary embodiment employing page switches 127 associated with a spread of pages, as illustrated in FIG. 1, book 100 is opened to the adjacent pages of a spread, the switch 127 associated with those pages, upon actuation, generates a signal to electronic circuitry 160. Circuit 160 then begins a sequence of visual and/or audible signals associated with the material presented on the spread. For example, the activation of switch 127 on such adjacent pages first triggers the operation of the circuitry on the left page. Electronic circuit 160 generates signals to cause the identification and highlighting of selected portions of the printed matter 126 on that page by activating or changing the state of corresponding visual devices 125 situated next to that matter and/or through the delivery of voice messages pertaining to the printed matter, all preferably in accordance with a predetermined order and interval of presentation programmed in the electronic circuitry 160.

Common electronic circuit 160 can be programmed according to methods well known in the art of integrated circuitry, to perform any sequence of visual and/or audio signal combinations in a manner tailored to produce maximum enhancement of the material presented. If desired, when the logic of possibilities on the left page is exhausted, as determined by the specific program designed for the book, sequencer 164 automatically starts a similar series of audible and/or visual signals for the adjacent right page in conjunction with the presentation of its printed material. The sequence of signals for each page may be the same or different, depending on the preprogrammed instructions. At the conclusion of the sequence for the right page, the apparatus stops (unless forced to repeat by the reader in response to an available option, as described above for the left page) until a new pair of switch elements 127 is activated by the opening of the book at another page.

Switches 129, which may be used in conjunction with or in lieu of switch 127, preferably comprise a pressure activated momentary contact switch incorporated in the circuitry of each page and manually operated by the viewer to activate the audio and/or visual functions associated with the corresponding portion of that page (or spread of pages).

Actuation of an individual switch 129 effects a sequence or sequences associated with that switch. As previously noted, each switch 129 is preferably associated with particular visual indicia, or passage, on a page or spread of pages. Alternatively, it can be associated with an entire page, or all or part of a pair of opposing pages (spread).

Where page switches 127 are employed in conjunction with switches 129, the programmed presentation effected through electronic circuity 160 may include interactive alternative or repetitive sequences for the viewer's choice, implemented by actuation of switches 129. For instance, at a certain point in the sequence of signal delivery effected in response to actuation of switch 29, an audible message would inform the reader of alternative progression choices in response to specific instructions communicated by the reader through the pressure switch 129 (which, in turn, could correspond to a recognizable feature in the displayed printed material). For example, after a series of light and/or sound signals associated with the printed image of a bear on the page (FIG. 1), a message would be heard instructing the viewer to press the bear's nose once to repeat, twice to play a game, or not at all to continue to the next page. The game could consist of any light and/or sound combination of signals deemed appropriate for the desired purposes and any level of interaction could be designed into the programmed sequence by requiring appropriate responses through additional pressure switches 129 similarly located to correspond to points of interest throughout the page. These various alternatives are matters of design choices concerning the audio and/or visual content of each book. Their implementation is a matter of programming electronic circuitry designed for the specific desired purpose, according to methods and apparatus that are well known in the art of speech synthesis and sequential light emission and that are not within the inventive scope of this specification. Therefore, the details of such implementation are not addressed here.

The method and apparatus of the present invention are particularly suitable for multi-leaf compilation. The approach used here utilizes novel methods for connecting the circuit 123 of each page to common electronic circuitry 160, which results in a more compact design and added versatility. A novel approach is also utilized in placing active visual devices 125 (e.g., LEDs) in the circuit 123 of each page in a way that reduces manufacturing costs and minimizes the space between pages occupied by the visual device, and by forming switches 129 (and 127, if utilized), and in some instances visual devices 125 employing conventional printing techniques.

Figure 5:
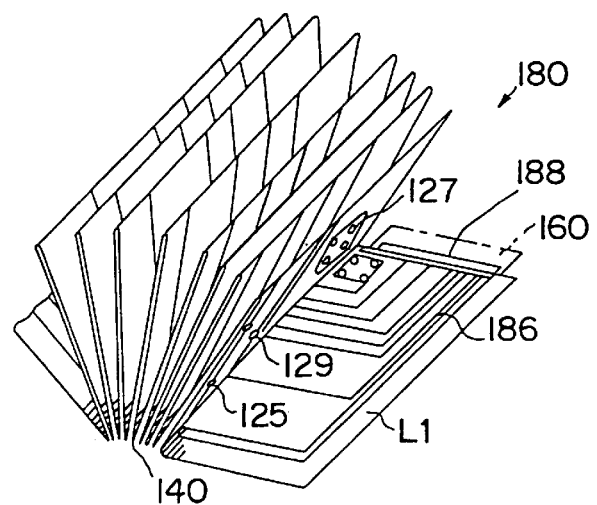
FIG. 5 is a perspective view of the continuous sheet of FIG. 4 after assembly into book leaf form.

As illustrated in FIG. 4, in one embodiment of the invention, a continuous circuit 186 (corresponding to the combined circuits 123 for each page of book 100) for the entire book is printed in flexible conductive ink on one side (the top side as shown in FIG. 4) of a continuous sheet 180. As previously noted, sheet 180 can be a core sheet (e.g., sheet 121) of a laminated page, or can itself bear visual information (printed matter) on the opposite side from, or on the same side as, (overlying or underlying) circuit 180. Referring to FIGS. 4 and 5, to form book 100, sheet 180 is then folded into equal segments in accordion fashion to form respective book leaves consisting of pairs of adjacent segments with inside (184) and outside (182) folds. Inside folds 184 are bound together to form the book's spine 140, while the outside folds 182 constitute the outer edges of the book's pages. FIG. 5 illustrates assembly of continuous sheet 180 into book-leaf form.

As shown in both FIGS. 4 and 5, a terminal circuit portion 188 is included in printed circuit 186, on the last segment (leaf) L1 of sheet 180, to provide a convenient point of connection with electronic circuitry 160, directly with electronic devices in the circuitry or through conventional interconnecting devices (not shown in the figures).

Connections between circuit 186 and electronic circuitry 160 can be effected, for example through a conventional mechanical connection (e.g., spring clip or spring loaded tongue connector), or through a conventional ribbon cable, connector pad or board, electrically between circuit 186 and circuitry 160. Alternatively, the terminals of circuitry 160 can be disposed to conform to the disposition of terminals in portion 188, and directly connected, employing, for example, z-axis anisotropic conductive adhesive (as will hereinafter be more fully described). Alternatively, the connections between the various elements of electronic circuitry 160 can be effected through circuit 186 itself; circuit 186 on end leaf L1 can include the connecting conductive paths, and the respective electronic components of common circuit 160 surface mounted on leaf L1.

Visual devices 125, switches 127 and pressure switches 129 are incorporated into continuous circuit 186 in the same manner as described in conjunction with FIG. 2; that is, the circuitry of each page is independently connected to the electronic circuitry 160 by separate conductive paths that run all the way from the particular page to last segment (leaf) L1 through the entire portion of the sheet 180 in between. The last segment L1 is then connected to electronic circuitry 160 via the terminal portion 188.

Where the pages are formed by lamination of continuous sheet 180 with matching printed material with non-opaque portions or apertures 128 corresponding to each in the circuit board layer of the book. Thus, the circuit 186 is covered throughout the book by sheets 124 containing printed material and non-opaque portions or apertures 128 for each underlying visual device.

Where a unitary page construction (i.e., visual material 126 is disposed on the substrate) as in FIG. 2B is employed, printing of the visual material (printed matter) and circuit 186, can be effected concurrently, or sequentially, on the continuous sheet, prior to folding using conventional printing equipment (e.g., a Gravere printing press). Any printing equipment that is capable of effecting selective solid coverage ink transfer distribution can be utilized. It should be appreciated that by printing material corresponding to a plurality of pages of the book on the same continuous substrate (web, or large sheet) registry between the pages of printed material and printed circuits, and between the positions of the respective printed circuits, is facilitated.

Suitable printing equipment include Gravere and Flex-O-Press printing presses and screen printing apparatus. Standard multi-station offset printing presses can also be utilized, if properly configured to print circuit 186 in "solid coverage," i.e., so that ink deposited by the press printing units does not include any interstices. In other words the dots of ink deposited by the press overlap or overlay to provide a continuous conductive path. Specifically, web-fed offset printing presses typically include a number of successive print stations (units). Each print station is associated with a particular color, and, typically, includes upper and lower sets of rollers to selectively apply ink of that color to both sides of the web (paper; substrate 180) on a substantially concurrent basis. The web passes through the respective printing units in sequence to develop a multi-color image. Specifically, each printing unit applies its respective ink in accordance with an associated dot matrix (corresponding to a color separation) established by a plate. The operation of the individual units is coordinated, so that the respective matrices as printed are in registry. The combinations of colors and relative dispositions of the matrices provide a composite image having the desired form, composition, and color. Visual matter 126 and circuit 186 can be concurrently printed employing one (e.g., the upper set) of print rollers in the respective units to lay down visual matter 126, and the other (e.g., the lower set) of print rollers in the units to print circuit 186 (123). Disposition of a continuous conductive path (i.e., solid coverage) can be facilitated by printing circuit 186 (123) employing a plurality of successive print units, each applying the conductive ink in sequence. The respective dot matrices laid down by the successive units would be slightly offset but overlay each other. The dots of ink, in effect, bleed together, to ensure a continuous conductive path. This can be facilitated by laying the conductive ink down more thickly than is typical for nonconductive ink in a typical color process.

Depending upon the layout of circuit 186, it may be desirable to provide insulation between portions of the circuitry brought into adjacency by the folding. As will hereafter be explained, this can be done by the insertion of insulative sheets, or by overprinting the conductive ink with nonconductive or dielectric ink. For example, circuit 186 can be selectively, or completely coated with a layer of flexible dielectric paint, such as the product marketed by Olin Hunt Specialty Products Inc., a subsidiary of the Olin Corporation of Ontario, California, under the name "37AC22 Curable Spacer" or equivalent insulating material. As will be explained, this process can be employed to make switches 129 in a particularly economical fashion.

Sheet 180 is preferably made of nonconductive material capable of accepting flexible conductive ink, as taught in the prior art. Any material suitable for making book leaves, such as paper or thin plastic, which can be folded without breakage, is acceptable. Typically, the fold lines are provided through what is referred to in the art of book-making as "living-hinge" technology, which involves the formation of a hinge line by scoring it or compressing it onto the material constituting the leaf of the book. The material used may vary from pure paper to pure synthetic substances, including a variety of composite materials. For example, the products sold by Paper Sources International under the trademark "Chromolux" and by the Champion International Corporation under the trademark "Cromekote" consist of paper coated on both sides with a layer of synthetic material, available in overall thicknesses from approximately 6 to 18 thousands of an inch. The product marketed by the Kimberly-Clark Corporation under the trademark "Kimdura" consists entirely of synthetic paper, a polypropylene material, available in thicknesses ranging from about 3 to 12 thousands of an inch. The materials marketed by the Spring Hill Paper Company under the trademark "Claycoat" and by the ICI Company of England under the trademark "Melinex" consist of a polyester substrate. These materials are all suitable to practice the invention and can all be folded for long-term durability by means of living hinges.

Where circuit 186 is printed on the back side of sheet 180, perforations or non-opaque portions may be provided in sheet 180 corresponding to each visual device (e.g., LED), so that it becomes visible with printed information.

Visual devices 125 may comprise commercially available LEDs. Such LEDs are available in a variety of thicknesses approximately in the 20 to 50 thousands of an inch range. For example, Instruments Design Engineering Associates, Inc. of Brea, Calif., sells an LED approximately 50 thousands of an inch (1.3 mm) thick, which is suitable to practice this invention. A much thinner, and therefore preferable, LED is sold by Citizens Electronic Company of Japan as Part No. CL-190YG-X, believed to be approximately 20 thousands of an inch thick.

Another novel aspect of this invention, suitable for embodiment in any of the configurations adopted for assembling the electronic book, is a method of manufacture of an LED structure within the circuit 186; each LED component is formed directly in sheet 180 of the book. Instead of mounting commercially available LEDs into the network of the circuit, construction of each LED structure 125 directly into circuit 186 on each page results in significantly lower manufacturing cost and lower overall thickness of the page. Thus, as illustrated in the greatly enlarged cross-sectional view in FIG. 6 of an LED site within a leaf of sheet 180, an LED can be operationally inserted into circuit 186 at predetermined sites using techniques similar to well known methods employed for mass production of TRDs: the desired sites for the LEDs are incorporated in circuit 186 (a break of predetermined length is provided in the conductive path) during the printing process, the ends of the conductor at the break saving is terminal for the LED; a base is prepared for each LED by laying a small length of conductive tape 191 across each set of LED terminals in circuit 186; and a semiconductor die chip 192 is deposited directly into the sites. Tape 191 is adhesive on both sides and laminated on the top side with a copper foil 193, appropriately scored in the middle to form two electrically separate copper strips. This kind of conductive adhesive tape is available commercially in a variety of forms produced by the 3M Company of Saint Paul, Minn., such as copper-foil-backed 9703 Transfer Conductive Adhesive. The section of tape used on each LED site is oriented so that each copper strip covers one of the terminals in the circuit 186. The conductivity of tape 191 is uni-directional only, so that a current can flow across but not along the plane of the tape; therefore, the two copper strips 193 are initially electrically insulated from one another, but are connected through the tape 191 to the corresponding circuit terminals on which they lie, thus forming suitable electrodes for integrating semiconductor die chip 192 into circuit 186. Semiconductor die chip 192 is then placed on the cathode side and electrically connected and bonded to the anode side by a strand of conductive epoxy resin 195 deposited on the anode side and stretched to make contact with the die chip. In practice, this bonding operation is performed simultaneously on multiple die chips on the tape, which is then cut to yield individual LED components. Each component is then affixed with the appropriate electrical orientation to the terminals in the LED sites of the circuit board layer and covered with a sufficient amount of nonconductive epoxy resin 196 bond it to sheet 180 and to the conductive ink of the circuit board layer 186. In addition, the resin 196 covering the site tends to acquire a curvature that forms a lens over the light emitting diode, thus further enhancing its effect in providing visual signals to the reader of the book.

Figure 6:
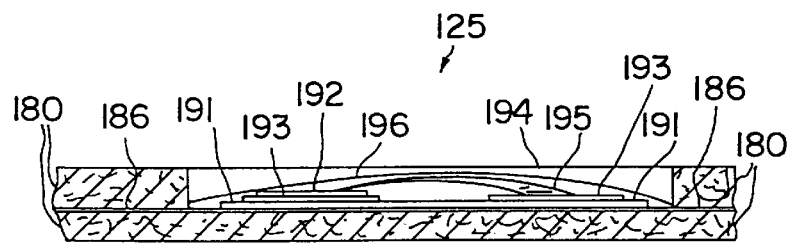
FIG. 6 is a cross-sectional view of a light emitting diode formed directly on the page of the book.

As explained above, where the LED is constructed on the back side of a segment constituting a page (as illustrated in FIG. 6), a corresponding perforation 194 on the adjacent segment of sheet 180 is required to make the LED visible from the front side of such adjacent segment. In that case, in order to properly coordinate the functioning of the visual display, the circuitry and the LEDs corresponding to each page may be placed on the back of the segment of core sheet corresponding to the opposite page (i.e., the back of the adjacent segment). This way, the LED can be seen through a perforation 194 placed on the page to which the LED pertains (i.e., the page on the adjacent segment).

The LED manufacturing industry provides standard equipment that can be used to manufacture the LEDs of the invention directly on the circuit board layer, as described above. Kulicke and Soffa Industries, Inc. of Willow Grove, Pa., provide several die bonders, such as the Models 6490 and 6491 Semiautomatic Die Bonders, that have proven suitable for the task. The average combined thickness of the conductive tape 191 and copper foil 193 used in the preferred embodiment of the invention (the 3M 9703 Transfer Conductive Adhesive mentioned above) is approximately 1.4 thousands of an inch; the semiconductor LED die chip 192, a product marketed by Hewlett-Packard, National Semiconductor, and other companies, is less than five thousands of an inch thick, depending on the specific product used; and the conductive strand 195, formed using LED wire bond material as available from Kulicke and Soffa Industries, is also approximately 5–10 thousands of an inch thick, depending on how it is laid. The nonconductive protective resin 196 (also available form Kulicke and Soffa Industries) that is used to cover the assembly of the other parts varies in thickness as needed. Therefore, the overall thickness of an LED so constructed is approximately 10–20 thousands of an inch, even including the arbitrary thickness of the protective lens 196. This constitutes a thickness reduction with respect to most standard LEDs, which can reduce the overall thickness of each page and permit the construction of an electronic book containing a large number of pages.

Figure 6A:
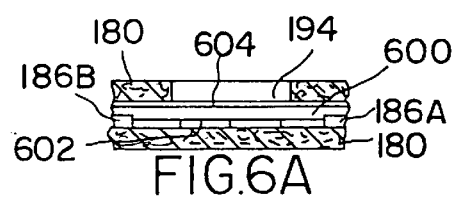
FIG. 6A is a cross-sectional view of a thermochromic display formed integral to the book leaf.

Visual devices 125, may also comprise persistent electrochromic material, displays such as described in U.S. Pat. 4,703,573 issued to Montgomery, et al., on Nov. 3, 1987, or thermochromic material. For example, thermochromic print may be used to implement one or more of active visual devices 125. Thermochromic printing is a well known technique. Referring to FIG. 6A, a layer of thermochromic paint or ink 600 and an adjacent (e.g., underlying) heat element, e.g., resistor 602, suitably formed of a printable layer of resistive material, such as printable carbon, between two conductive leads 186A, 186B on a support foundation (sheet 180). When electric current is passed through resistor 602, the heat generated by the current causes the thermochromic paint to change color, normally from an unobtrusive grey to a bright color of choice. Thus, this technique is particularly suitable for use as an active visual element in book 100. If desired, a protective coating 604 of clear plastic, may be deposited (printed) over thermochromic ink 600.

Just as detailed above and illustrated in FIG. 6 for LEDs, the respective layers of thermochromic paint and conductive material can be laid across sets of terminals in the circuit 186 to form a thermochromic element. The thermochromic element is suitably disposed in registration with a non-opaque portion or aperture 194 in the overlying section sheet 180. Alternatively, the thermochromic element (conductor, resistor, and the thermochromic ink) can be printed on the exposed surface of sheet 180, with the conductive circuit 186 being overprinted with the visual (printed) material. Alternatively, the conductors of circuit 186 can be printed on the back side of the sheet, coupled to resister 602 using conventional through hole techniques (i.e., the conductive ink is bled through the paper through sheet 180 through perforations preformed at the desired position of the thermochromic element). Printable thermochromic paint is available in various colors from the Murfin Division of the Menasha Corporation of Neeha, Wisconsin; and printable carbon is available from Olin Hunt under the name "Advanced Thermoset Polymer Thick Film IL-I Graphite Conductor."

Thermochromic inks are normally offered in two formats. In one format the ink changes color when heated above a certain temperature and returns to its original color when cooled down. In the other format the ink is transformed into an almost transparent state by heat and returns to the original color when cooled down. The cycle can be repeated each time as the temperature is increased or decreased and is the same for both color-to-color and color-to-colorless options. There are several different types of thermochromic inks (12 offered by Menasha) with threshold temperatures ranging from −3° C. to 580° C. Similarly, original and changed colors can be specified within a wide range of colors, including colorless among the latter, which can be used to expose a printed design underneath the original color. Finally, thermochromic inks can be printed on most ordinary printable surfaces.

Visual devices 125 can also be implemented using electro-illuminating ink, which can be laid between terminals in the circuit board layer of the invention in the same way as LEDs and thermochromic print. This ink is conductive, like the ink used to form the circuit 186 but it becomes luminous when current flows through it. Therefore, it affords an easy tool for illuminating the printed matter in the book with a variety of glowing colors. Electroilluminating ink is available in different colors, for example, from the Murfin Division of the Menasha Corporation.

Heat element (e.g., resistor) 602 can also be employed in cooperation with materials that release a scent when heated (thermo-olfactory materials). In such case, the conductor and resistor 602 are printed on the exposed surface of sheet 180, with resistor 602 being overprinted with the scent releasing material, and conductive circuit 186 being overprinted with visual (printed) material.

Figure 7A:
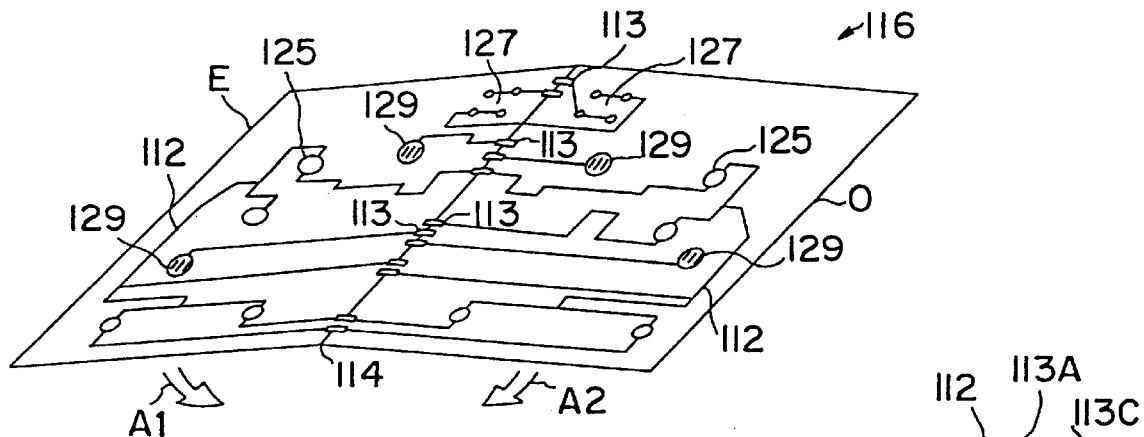
FIG. 7A is a perspective view of a modular substrate sheet used to form one leaf corresponding to two opposite pages of the electronic book according to another embodiment of the invention.
Figure 7B:
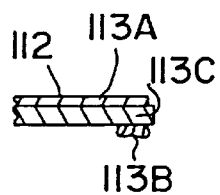
FIG. 7B is a cross-sectional view of a through page conductor employed for inter-page connections.
Figure 8:
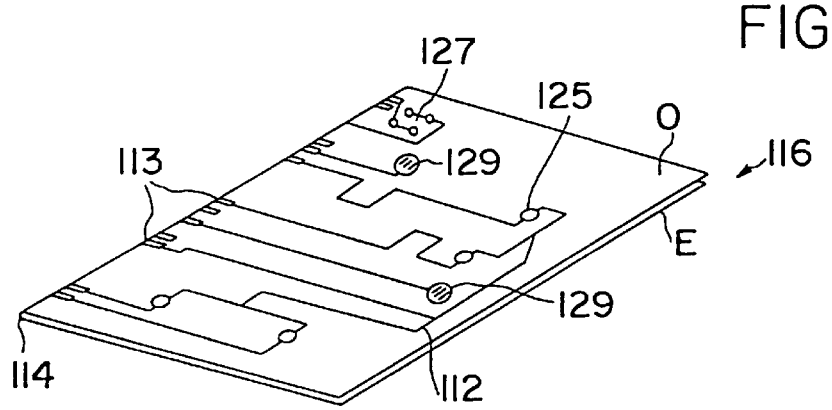
FIG. 8 is a perspective view of the modular substrate sheet of FIG. 7A after assembly into a modular book leaf.
Figure 9:
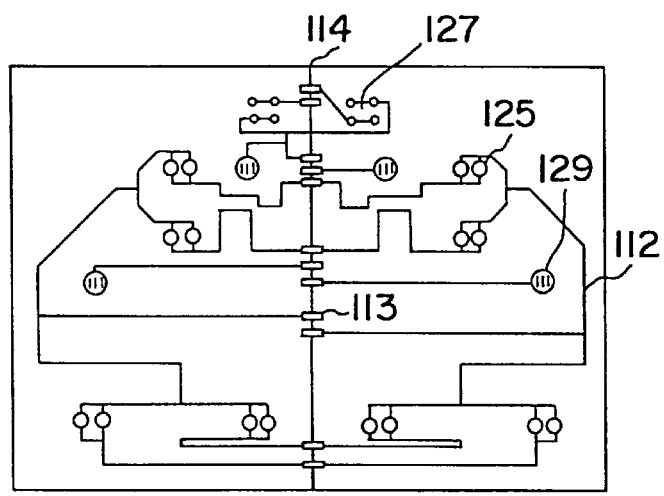
FIG. 9 is a plan view of an example of a circuit printed on the modular substrate sheet of FIG. 7A showing conductive paths through the center fold for connection, through the spine of the book, to electronic circuitry housed in the book cover.

In another embodiment of the invention, printed circuit 123 of each page is further simplified by a modular approach to the construction of each book leaf. This approach assumes different configurations depending on whether a circuit 112 (corresponding to circuits 123 and 186) is printed on the front or the back side of the substrate forming the leaf. Referring now to FIGS. 7, 8 and 9, when circuit 112 is printed on the front side, as shown in FIG. 7A, each leaf of the book consists of one substrate sheet 116 bearing printed matter (either by way of laminated printed sheet, or by directly printing on sheet 116), corresponding to two opposite pages on the same leaf, (referred to in the figure as O and E for odd and even with reference to conventional page numbering) folded at a centerline 114. Each sheet 116 bears a circuit 112 corresponding to the specific display requirements of the two pages O and E, with the same general characteristics described above for the continuous sheet 180 of FIG. 4. The conductive paths of circuit 112 originate/terminate in connections 113 lying across (spanning) center fold 114 of sheet 116. Centerfold 114 becomes a common edge between the two opposite pages after folding of the core sheet and becomes part of the spine of the book after assembly into book format. Thus, the circuitry of each individual page (containing electrical elements, e.g., visual devices 125, switches 129 and, if utilized, switch 127 for that page) is self-contained, independent of the circuitry in any other page, and connected to the electronic circuitry 160 through connections 113.

The circuit 112 of each page is connected in parallel to the circuitry of each other page, and is controlled directly by circuitry 160 through separate connecting terminals. As illustrated in FIG. 8, by folding each sheet 116 in the direction of arrows A1 and A2 and along center fold 114, a book leaf 116 is formed wherein the edge corresponding to the center fold 114 constitutes the inside margin of each opposite page O and E (and the common edge of the folded module), and wherein each page contains the half of the circuit board layer 112 that pertains to its printed material. By properly positioning the connections 113, which span the fold 114 of leaf 116, these connections can be used as the conductive paths to electronic circuitry 160. An example of one such circuit board layer 112 is shown in FIG. 9, wherein each active visual element site is shown with two LEDs.

If it is desired that centerfold 114 be employed as the outer edge of the book, and the opposite edge be bound in the spine, terminal connections would be provided along the edges opposite fold 114. Specifically, referring to FIG. 7B, a perforation 113C would be formed in sheet 116 at the desired position of terminal 113.

During the printing of circuit 112, conductive ink is deposited over perforation 113. As will be more fully discussed in conjunction with the unfolded leaf embodiment of FIG. 18, the conductive ink will bleed through perforation 113C so that conductive terminals (113A, 113B) are established on both sides of sheet 116, to facilitate interconnection with the other leaves.

Figure 10:
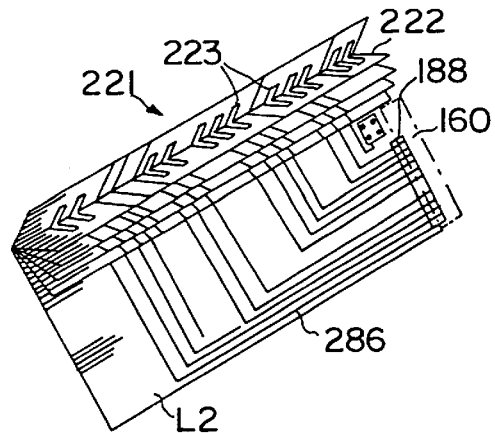
FIG. 10 is a perspective view of a fan-like spine for receiving each modular book leaf, as shown in FIG. 8, between flaps that contain corresponding connections to the control circuitry of the book.
Figure 11:
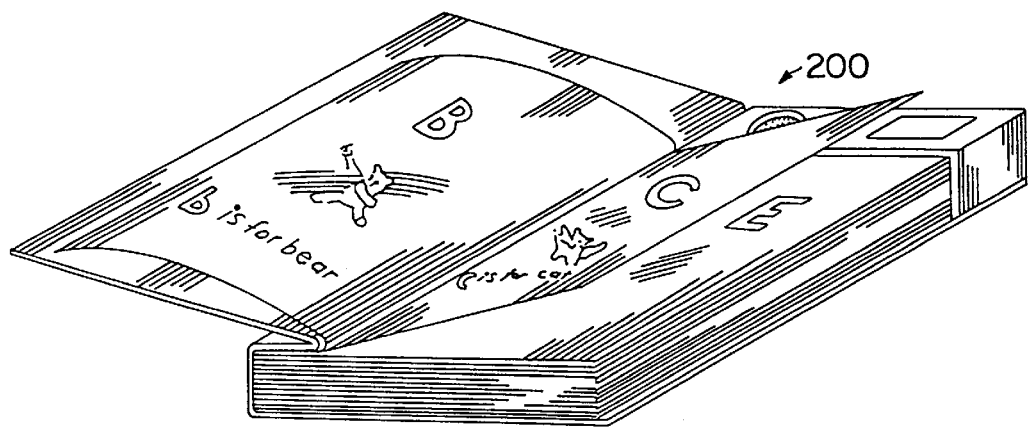
FIG. 11 shows a perspective view of an embodiment of the invention manufactured according to the spine and modular leaf approach illustrated in FIGS. 8 and 10.

If desired, connections between the respective individual book leaf 116, and electronic circuit 160 can be facilitated through use of a specially constructed spine. Referring to FIG. 10, such specially constructed spine 221, is fan like, including respective flaps 222 for receiving each book leaf 116. Flaps 222 sandwich book leaves 116 and contain connections 223 configured to correspond and, in assembly to become coupled to, connections 113 of each leaf. A conductive path to the electronic circuitry 160 is thus formed through a last segment L2 (equivalent to the last segment L1 of the continuous sheet 180 shown in FIGS. 4 and 5). Like continuous sheet 180 of FIGS. 4 and 5, spine 221 is constructed by forming on a single sheet, suitably by printing in flexible conductive ink, a printed circuit 286 converging at end segment L2, for coupling with the electronic circuitry 160 through terminal portion 188. The continuous sheet of spine 221 is folded in accordion fashion (except for the segment L2) into equal narrow segments (flaps 222) to form spine 221 as shown in FIG. 10. A specific conductive path goes from each connection 223 to the last segment L2 through spine 221 and there it is routed to a common terminal portion 188. Therefore, once inserted into the spine and coupled to connections 223 between each pair of flaps 222, connections 113 of each modular book leaf 116 are directly connected to terminal portion 188 (and therefore to the electronic circuitry 160) through the continuous circuitry printed on the continuous sheet of the spine 221. FIG. 11 shows a perspective view of an embodiment 200 of the invention manufactured according to the spine and modular leaf approach just described.

One of the advantages of this modular approach is that each pair of pages O and E on the opposite sides of each leaf can be designed independently of the rest of the book, the only constraint being in the points of connection 223 through the spine 221. In addition, if the same visual display configuration, i.e., circuit 112 is used for all pages in the book, the modular approach makes it possible to use the same leaf sheet (116 for example) for the entire book, identical in all respects except for one identifying connection 113, laminated or printed with different printed material for different pages, thus greatly decreasing the cost of printing individual circuits 112 for each page. By comparison, the versatility of the accordion approach of the first embodiment is limited by the requirement that all electrical paths for the entire set of pages be cumulatively run through the continuous core sheet to the last page for connection with the terminal board 188. This means that the complexity of each individual page is necessarily reflected in progressively crowded circuitry toward the last page, where it all converges for connection with the terminal board. Therefore, the complexity of the circuitry on each page is necessarily limited by corresponding physical space requirements. Moreover, the accordion approach requires that any modification to circuit 186 be reflected in a manufacturing change to the entire continuous sheet 180, instead of only one leaf 116, with obvious cost and versatility drawbacks.

Figure 12:
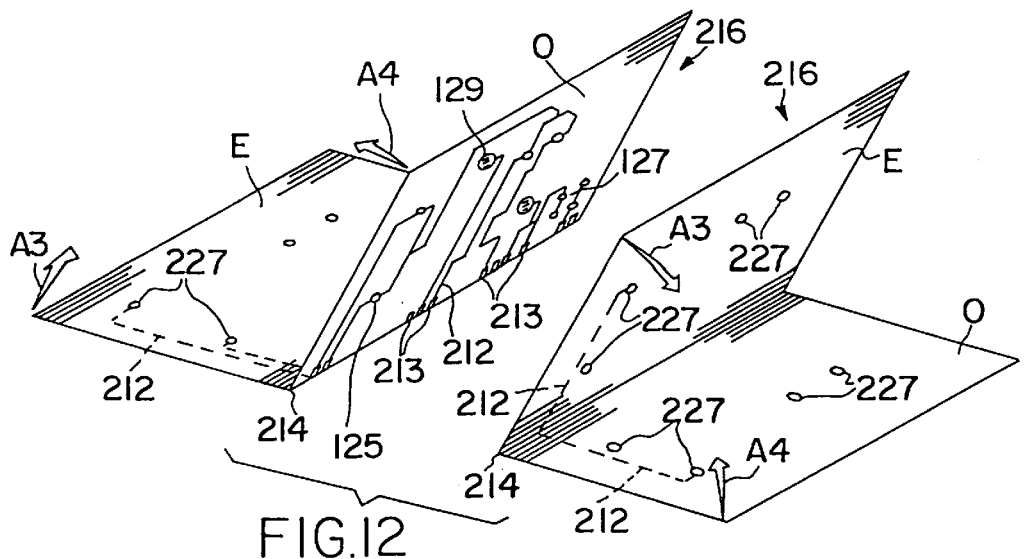
FIG. 12 is a perspective view of another kind of substrate sheet used to form adjacent modular book spreads, each corresponding to two facing pages, of the electronic book according to yet another embodiment of the invention.
Figure 13:
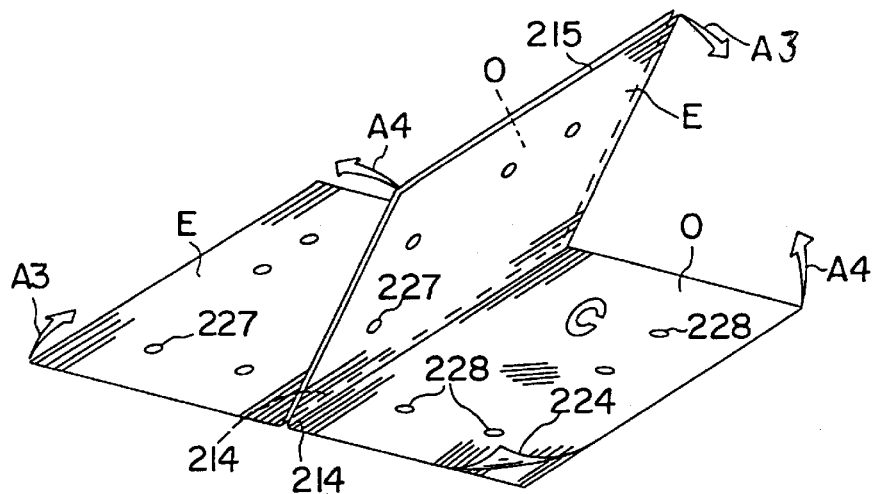
FIG. 13 is a perspective view of the modular substrate sheets of FIG. 12 after assembly into a book leaf and two corresponding book spreads.
Figure 14:
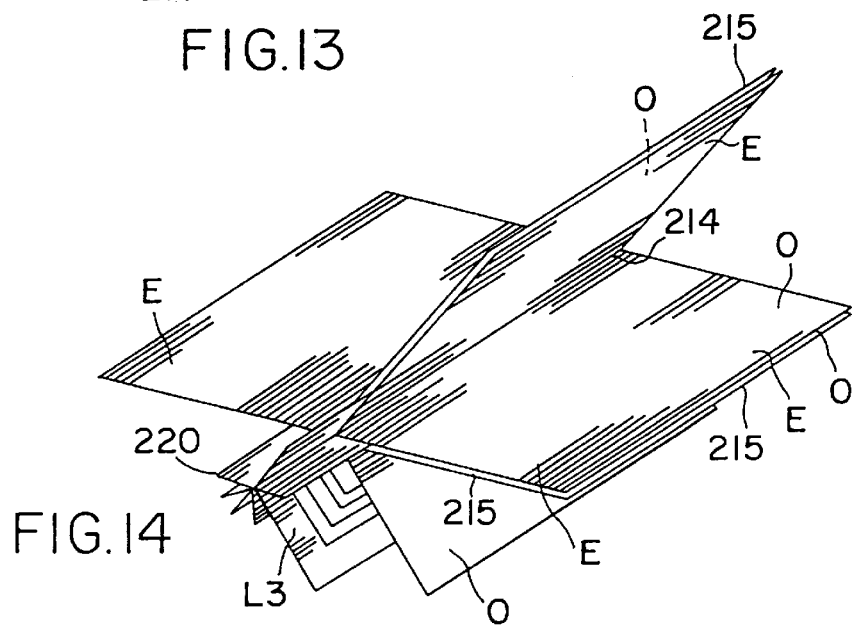
FIG. 14 is a perspective, semi-exploded view of a fan-like spine for receiving each modular book spread while being combined to form book leaves, as shown in FIGS. 12 and 13, between flaps that contain corresponding connections to the control circuitry of the book, wherein the spine is partially extracted for illustration.

Referring to FIGS. 12–14, the modular approach can also be employed with circuit 112 formed (e.g., printed) on the back side of the substrate sheet for each page. Each module of the book comprises one substrate sheet 216 corresponding to a spread of two facing pages (E, O) on adjacent leaves. Sheets 216 have the same general characteristics described above for the continuous sheet 180 of FIG. 4. By folding each sheet 216 in the direction of arrows A3 and A4, along a center fold 214, as seen in FIG. 12, and by joining adjacent modules 216, as shown in FIG. 13, book leaves 215 are formed with the center folds 214 constituting the inside margins of each facing page E and O. As illustrated in FIG. 13, where leaves 215 are formed by combining pairs of substrate sheet modules 216, the back sides of opposite pages come together and sandwich their respective portions of the circuit 212. A top sheet 224 bearing printed matter and light apertures 228 (or corresponding non-opaque portions) may be affixed to each page to complete a laminated assembly (as shown in FIG. 13), or printed matter can be selectively printed directly on the substrate sheets. This construction is also particularly suited for printing visual material through reverse lay down processes on a non-opaque (e.g., transparent) substrate, and overprinting circuit 212 on the visual material. Where a top sheet 224 or an opaque substrate is employed, the back of each page suitably contains the portion of the circuit 212 that pertains to the printed material of the opposite page of leaf 215. For example, in the embodiment of FIGS. 12 and 13 employing top sheet 224, the circuitry on the back of the odd page O on the left module in the figure corresponds to the printed material on the front of the even page E of the right module; similarly, the circuitry (not seen in the figures) on the back of the even page E on the right module necessarily corresponds to the printed material (also not seen) on the front of the odd page O of the left module. In any event, the respective portions of circuit 212 printed on the back of each spread are suitably connected to other portions by connections 213 along, and preferably spanning, center fold 214. Since this configuration may cause portions of the circuit on adjacent sheets 216 to be in direct contact with one another because sandwiched between segments of adjacent spreads to form book leaves, it may be desirable to protect the circuit board layers by coating them with a layer of flexible dielectric paint, such as the Olin Hunt "37AC22 Curable Spacer" product mentioned above, or equivalent insulating material.

Each substrate sheet 216 can be plugged in modular form into a matching spine 220 (seen in FIG. 14) equivalent to the spine 221 of FIG. 10, with the connections 213 of each circuit 212 disposed to overlap corresponding connections 223 (see FIG. 10). Spine 220 is shown in FIG. 14 only partially enmeshed with several substrate modules for clarity. Each module 216, comprising one spread of facing pages, is received between sets of flaps, with the flap interposed between the pages forming a leaf. Spine 220 provides the point of connection for each page to common electronic circuit 160 (not shown in FIGS. 12–14); each connection 223 in the spine is tied to a conductive path that is routed through the last segment L3 of the spine to the terminal portion 188 (not seen in FIG. 14), which is in turn coupled to the electronic circuitry 160.

The embodiment of FIGS. 12–14 is particularly advantageous in that each pair of pages E and O on facing sides of each spread can be designed independently of the rest of the book, the only constraint being the disposition points of connection through the spine. In addition, if the same printed circuit layout is used for all spreads in the book, the modular approach makes it possible to use the same core sheet 216 for the entire book, with a single different connection 213 in each circuit board layer for identification purposes, laminated or printed with different printed material for different pages, thus again greatly decreasing the cost of printing individual circuits. Such modules can be created, if desired, by printing a standard circuit on all modules, then selectively overprinting various connectors 213 with nonconductive ink.

A separate spine structure (220 and 221 in FIGS. 14 and 10, respectively) can be physically omitted from the book, if connections 213 (or 113; FIGS. 7–9) in adjacent modules overlap one another, such that the. abutting connections 213 (or 113) provide sufficient electrical contact, when bound together, to form the required electrical paths to the last segment of the circuit (L2 and L3 in FIGS. 10 and 14, respectively). Such a constructions is facilitated by use of conductors spanning the fold of the modules (leaves or spreads depending upon the mode of construction) at which the modules are bound together, i.e., constituting the spine. As will be more fully described in conjunction with FIG. 18, where unfolded modules are employed, through hole techniques (FIG. 7B) are suitably employed to extend the conductor terminal to both sides of the module.

Figure 15:
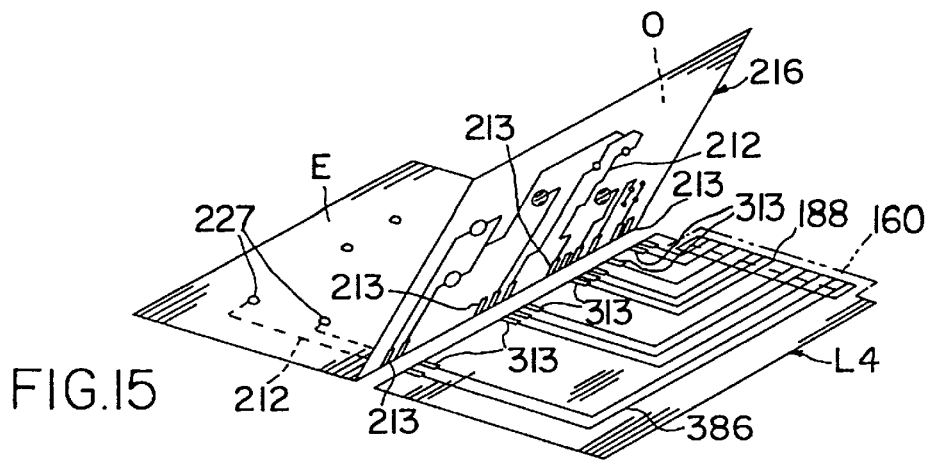
FIG. 15 is an illustration of exemplary electrical paths used to route the circuitry of the book of FIG. 12 through the last book-spread module to a terminal portion.
Figure 16A:
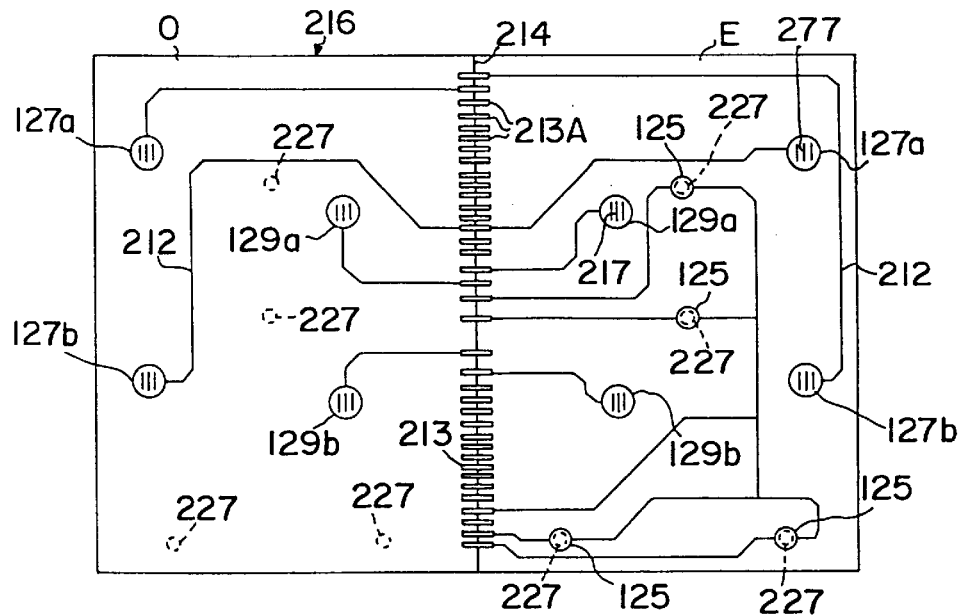
FIG. 16A illustrates an exemplary layout of the circuit of the substrate sheet shown in FIG. 12.

Referring to FIGS. 15 and 16, a particularly economical mechanism for completing the connection between remote pages (leaves) and electronic circuitry 160 is effected through use of free connections 213A in each module (in FIG. 16A for example, 25 connections are shown as free, i.e., not connected to circuit 212). Free connections 213A serve as bridges, through abutting connections in all adjacent modules, completing a connection from a module in which it is connected to circuit 212 of that particular module to a different module containing a conductor connected to the corresponding connection 213 completing the connection to electronic circuit 160. Thus, all modules may feature the same set of connections 213, but each module uses one different connection for coupling with electronic circuitry. Thus, as seen in FIG. 15, the spine assemblies 220 and 221 may be functionally replaced by a single-sheet last segment L4 containing electrical paths 386 that couple each connection 213 (or 113) on the last module 216 (or 116) to terminal portion 188 and hence to circuit 160. Of course, every other connection 213 (or 113) in the adjacent modules becomes also connected to the terminal board 188 by virtue of the contact between abutting connections 213 (or 113). Single-sheet segment L4 can also be eliminated altogether by coupling electronic circuitry 160 directly to the connections 213 (or 113) in the spine of the book.

The contact between abutting connections 213 (or 113) in this embodiment of the invention, may be improved through use of selective disposition of conductive adhesive over abutting connections 213 (isolation between adjacent connections on sheet 216 maintained) or by general application of a strip of anisotropic conductive material (adhesive) along the bound edge. This material, also referred to in the industry as a z-axis conductive membrane, is characterized by its directional electric conductivity across its thickness (the z-axis) and by its otherwise insulating characteristics in any other direction. It is available in tape form, such as the Scotch Brand 9703 Conductive Adhesive Transfer Tape sold by the 3M Company of St. Paul, Minn.; or in liquid form, as the Anisotropic Heat/Pressure-Seal Coating 41DJB130 sold by the Olin Hunt Company of Ontario, California. In either form, the anisotropic conductive material is laid on the circuit board layer 212 (or 112) to cover the connections 213 (or 113), and it is sandwiched between the modules to provide electrical contact between each pair of abutting connections without causing electrical shorting with the adjacent circuitry. Some of these products (e.g., the Scotch transfer tape) are placed on the circuit board layer as tape, which is cut to cover the desired portions of the board. Others (e.g., the Olin Hunt coating) are spread as a thin layer of paint or adhesive (0.5 to 1.5 mils in thickness), and are then subjected to pressure and/or heated to cure into a membrane with the required anisotropic characteristics. In any event, with or without the aid of anisotropic conductive material, the book of the invention can be bound according to conventional book binding procedures, requiring an adhesive (such as one of the glues normally used in bookbinding) to form a spine holding the modular leaves or spreads together.

It should be noted a sandwich leaf construction as illustrated in FIGS. 12–15 is particularly advantageous in that a single visual device (e.g., LED, thermochromic element, or electro-illuminating ink site) can be used for two opposite pages. By sandwiching the visual device between two perforations 227 on opposite pages and connecting it to the circuitry of both pages, the same device becomes available for the function of the circuit board layer for each page. A lens formed, e.g., with the nonconductive epoxy resin 196 shown in FIG. 6, may be used on both sides of the visual device to protect it from damage through the perforations 227. In the case of thermochromic elements, two different thermochromics can be used around (e.g., underlying and overlying, respectively) a single resistor (e.g., strand of carbon) to produce different colors on each side. Obviously, any combination of LEDs, electro-illuminating ink, and thermochromic elements can be used throughout the circuit board layer of the invention without affecting any of the features described in this specification.

A "sandwich" leaf construction, as employed in various embodiments of the present invention, is also particularly advantageous in that it facilitates the formation of switches (e.g., switches 129) employing conventional printing processes. For example, conductive pads may be printed on the interior surfaces of the respective pages of the leaf, disposed for general registry when the leaf is assembled (e.g., opposing pages folded as in FIGS. 2B, 4, 5, or brought together in binding as in FIGS. 12–14), with a spacer interposed between the pages. As hereinafter will be explained, the spacer can be implemented using conventional spot gluing apparatus, or by selective printing with a nonconductive or dielectric ink. The sensitivity of the switches, both as to the pressure necessary to effect a connection, and as to the necessary localization of force, is controlled, as noted above, by the pattern and relative disposition of the spacer to the conductors.

Referring to FIG. 16A, an exemplary layout of a circuit 212 (i.e., used in the modular configuration described in the embodiments of FIGS. 12–16) implementing switches 127 and 129 for each page of the leaf. As more clearly shown in FIG. 16B, switches 127 (and 129) comprise: a respective conductive pad, 127A, disposed on the interior surface of one page (e.g., 216E) of the leaf; a corresponding pad (1270) in the portion of circuit 212 of the opposite page (2160) on the same leaf 216, and an interposed spacer, suitably pressure sensitive dielectric medium 217, such as the Olin Hunt 37AC22 Curable Spacer product mentioned above. Conductive pads 127A (127B) are disposed to abut corresponding pads on the opposing pages (216E, 2160) of the leaf when module 216 is folded and the leaf assembled. Conductive pads 127A (127B), while shown in circular configuration in FIG. 16B, may be of other configurations. For example, the conductive pads may be configured as fringes, with one conductor rotated 90° with respect to the others.

Dielectric medium 217 is interposed between pages 216E and 2160, preferably printed in a predetermined pattern on one or both of the leaf interior surfaces in predetermined positions, e.g., adjacent, circumscribing or overlying, conductive pads 27. The pressure necessary to actuate the switch can be closely controlled by forming spacer 217 as a grid having lines 217A and spaces 217B, overlying pad 127A. The conductive surfaces can be forced into contact through dielectric grid spaces 217B by exerting a predetermined force; the insulating function of the dielectric medium is bypassed when a certain level of pressure is exerted upon it, thus connecting the two pads and activating the switch formed by them. Thus, the two switches formed by the switch element pairs 127a and 127b are utilized as pressure switches to activate the odd and even page, respectively, of the leaf. The amount of force necessary to effect contact is a function of the denseness of the grid. Actuation at approximately 7 ounces per square inch of pressure is preferred. A seven ounce per square inch pressure requirement can be obtained by overprinting conductive pads 127A with a grid of dielectric 0.0008 inch thick, with dielectric spacer lines 217A 0.020 inch wide, and line spacing 217B of 0.02 inch. To increase the required localization of the force, i.e., require that pressure be applied directly to the switch, the dielectric includes an annulus (ring) 217C circumscribing the conductive pad. The respective pads 127A and 127o are brought into contact through spaces 217B between grid lines 217A, only in response to pressure from directly above the pads.

Specifically, in order to bring the switch elements into contact, sufficient force must be applied to create a localized deflection of one of the elements out of the plane of the page into contact with the other element through spaces 217B. Ring 217C tends to prevent pressure applied outside of the area circumscribed by the ring from causing such a localized deflection. The requirement of localized pressure (pressure specificity requirement) makes such switch construction particularly suited for use in multi-page books. The pressure specificity requirement militates against accidental actuation of switches by pressure applied to other switches on the same page or proximate pages. Intervening pages cause a dispersal of pressure, so that a switch on one page can be disposed underlying a switch on another page with only a few leaves interposed; e.g. leaves with switches at other dispositions between the overlying switches (the number of necessary interposed leaves is a function of the thickness of the leaves).

Figure 16B:
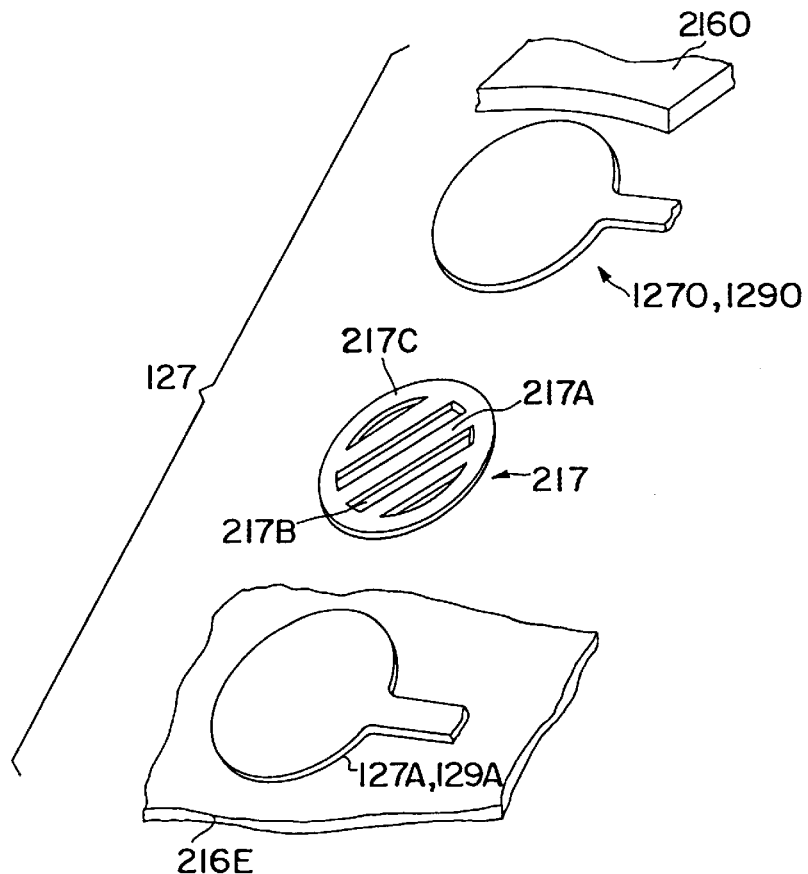
FIG. 16B is an exploded top of a momentary contact switch in accordance with one aspect of the present invention.

A similar approach can be employed, if desired, to selectively effecting connections between two conductors disposed on the same sheet of the leaf. Referring to FIG. 16C, one of the conductive pads (127A, 127o) would be replaced by respective proximate conductors, suitably interdigitized fingers, constituting the terminals 127X, 127Y of the switch printed on the interior surface of one of the leaf pages. Terminals 127X, 127Y are suitably disposed in predetermined relationship with an associated portion of the visual material on the leaf. As in the embodiment of FIG. 16B, a spacer 217A is interposed between the interior surfaces of the leaf pages, and a conductive connector (not shown in FIG. 16C) is formed on the interior surface of the opposite leaf page, disposed so that when the leaf is assembled (i.e., opposing pages folded as in FIGS. 2B, 4 or 5, or brought together in binding as in FIGS. 12–14), it is normally set off from the switch terminals by the spacer, but effects an electrical connection between switch terminals 127X and 127Y in response to application of a predetermined force. Spacer 217A may comprise a grid or ringed grid such as shown in FIG. 16B, disposed over terminals 127X and 127Y. Alternatively, spacer 217A may comprise dielectric ink overprinted on terminals 127X and 127Y, as shown in FIG. 16C. spacer 217A suitably covers approximately 60% of the surface area of terminals 127X and 127Y.

Switches 129 for interactive sequences controlled by the viewer are similarly implemented by switch elements 129A and 129B incorporated into each half of circuit 212. Thus, by combining adjacent modules in the manner shown in FIGS. 12 and 13, the circuit 212 of FIG. 16A forms switches 127 and 129 sandwiched in each leaf 215 that are used to interact with the electronic control circuitry 160 to activate and control the various audio and/or visual functions programmed for each page on that leaf.

Figure 17:
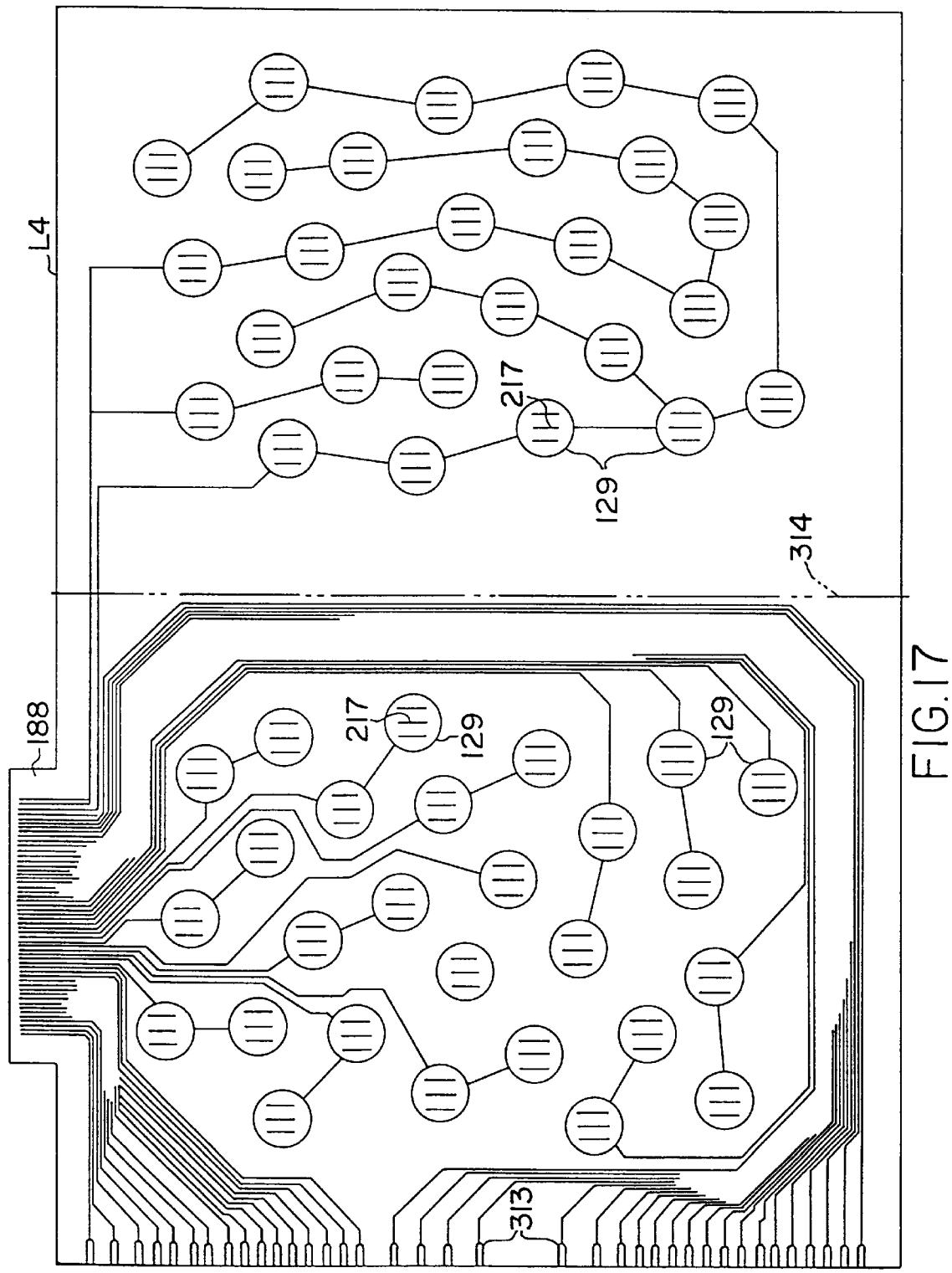
FIG. 17 shows an exemplary layout of the circuit board layer of the single-sheet last segment, featuring the same set of connections of the circuit board layer of FIG. 16A.

FIG. 17 shows an exemplary layout of the last segment L4 in an embodiment of FIG. 16A, featuring the same set of connections 213 for coupling with the modules 216 in the manner shown in FIG. 15. Multiple switches 129 are also included in the circuitry. By covering all the switch elements 129 with the dielectric medium described above and by folding the segment L4 along a center fold 314, matching pairs of switch elements 129 form manually actuated pressure switches that give the viewer game options to enhance the recognition of printed material superimposed on each switch. For example, pressing the letter B placed over one switch may initiate a repetition of the audio display used before in the book to illustrate the letter B in conjunction with the picture of a bear, and so on.

Figure 18:
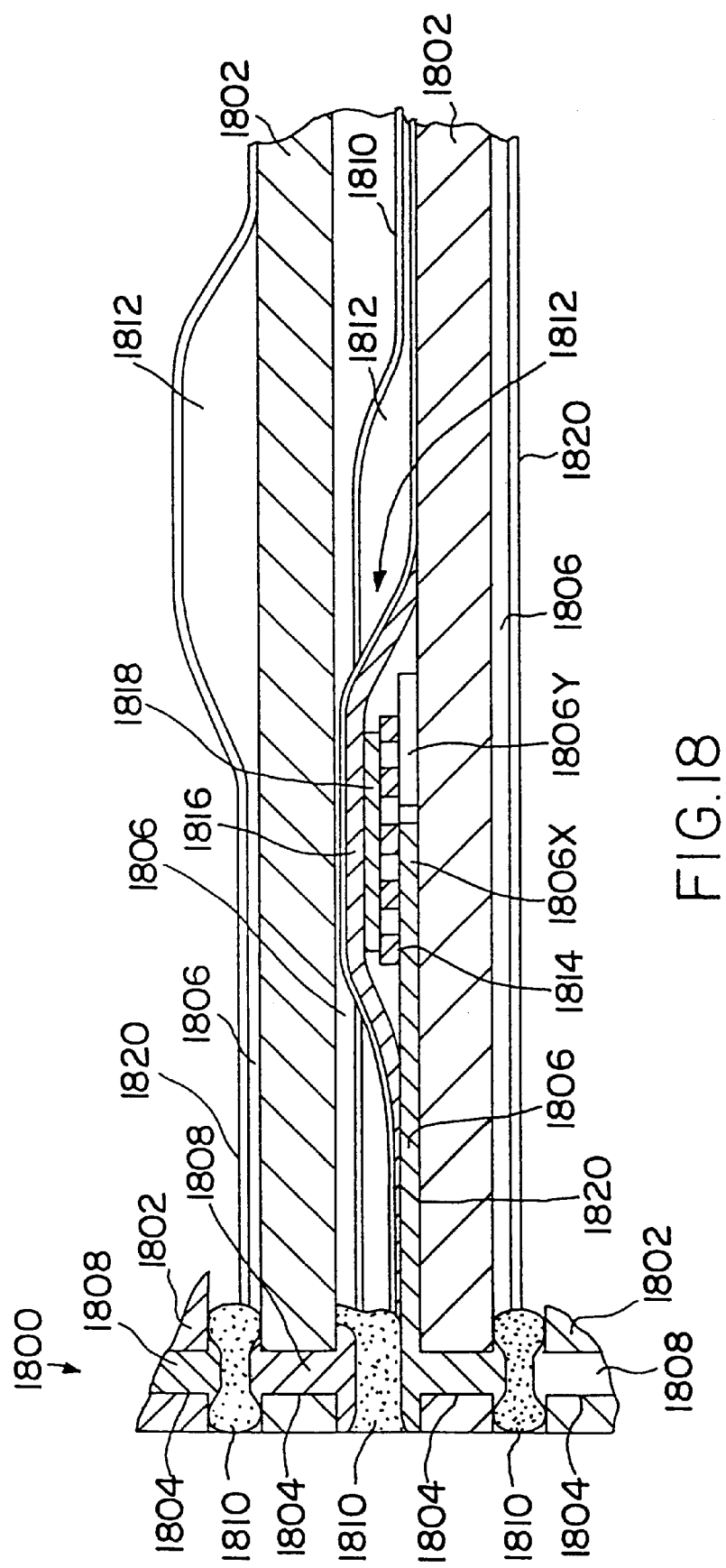
FIG. 18 is a sectional view of a further embodiment of the electronic book in accordance with the present invention employing single unfolded sheet leaves.

In some instances, it may be desirable to construct an electronic book employing leaves formed of a single unfolded sheet. Referring to FIG. 18, a book 1800, includes a plurality of sheets 1802 (shown in FIG. 18 in greatly enlarged cross section). Sheets 1802 are suitably any material capable of accepting flexible conductive ink. Perforations 1804 are formed at predetermined positions on each sheet 1802 of the book. Printed circuits 1806 (analogous to printed circuits 123 of FIGS. 2A, 2B; 186 of FIG. 4; 112 of FIGS. 7–9; and 212 of FIGS. 12, 15 and 16), are formed integral to sheets 1802, preferably laid down, preferably using conventional printing equipment as previously described, on each side of the sheets 1802.

Each perforation 1804 is overprinted with conductive ink, either as part of an active circuit 1806, or as a free connector 1808 (as previously discussed in connection with FIGS. 15 and 16). In each instance, the conductive ink flows through perforation 1804 (as previously discussed in connection with FIGS. 7A and 12–14) to provide for interpage connectors, for effecting electrical connections between integral circuits 1806 and common electronic circuit 160 (not shown in FIG. 18). Perforations 1804 are preferably of a size and configuration (e.g., round) such that a meniscus is formed extending outwardly of the opposing surface of sheet 1802 to establish the interpage connector (e.g., 1808) in a single print process. However, in some instances it may be desirable, particularly in embodiments where conductive ink circuits are printed on both sides of the substrate, to deposit conductive ink over perforation 1804 from both sides of sheet to establish interpage terminals of a predetermined size and configuration on both sides of the leaf.

As in the previously described embodiments of the invention, sheets 1802 may include one or more switches 1812, associated with a portion of the visual material on the page (or set of pages). Switches 1812 suitably comprise a pair of conductive paths 1806X, and 1806Y (analogous to terminals 127X and 127Y in FIG. 16C) cooperating with an overprinted dielectric spacer 1814 (analogous to spacer 217 of FIG. 216). A flexible membrane 1816 having a conductive pad 1818 disposed on the undersurface thereof, a suitably printed in flexible conductive ink (analogous to pad 1270 in FIG. 16B) is disposed over spacer 1814. Membrane 1816 is affixed to page 1802 by a suitable adhesive. Visual material (e.g., images, characters, and/or text) 1820 is then applied, suitably by conventional printing processes to pages 1802, overlying circuits 1806 and membrane 1816. To ensure a good interconnection, and to facilitate binding, an anisotropic conductive adhesive 1810 (z-axis conductive) as previously described is applied between pages 1802 at the spine. Book 100 may then be bound in accordance with conventional techniques; as will be understood the embodiment of FIG. 18 is particularly suited for perfect binding techniques.

It will be understood that while various of the conductors and connections are shown in the drawing as single lines, particularly FIGS. 3A and 3B, they are not so shown in a limiting sense, and may comprise plural conductors or connections as understood in the art. Similarly, power connections, various control lines, and the like to the various elements are omitted from the drawing for the sake of clarity. Further, the above description is of preferred exemplary embodiments of the present invention, and the invention is not limited to the specific forms shown. Modifications may be made in the design and arrangement of the elements within the scope of the invention, as expressed in the claims.

I claim:

1. An apparatus for presenting combined visual and sensory material comprising:
   a. a circuit comprising a memory, the memory responsive to a first switch, the circuit for identifying sensory material in response to the memory;
   b. a plurality of leaves bound together each at a respective edge to form a binding, each leaf comprising:
      (1) visual material;
      (2) a respective second switch formed within the leaf and associated with the visual material; and
      (3) a respective conductor formed within the leaf and extending from the respective second switch to a position proximate to the respective edge; and
   c. a plurality of inter-leaf conductive paths through the binding for coupling each respective second switch to the circuit, the circuit for presenting identified sensory material in further response to any respective second switch operation.

2. The apparatus of claim 1 wherein the circuit further comprises a speaker for presenting the identified sensory material.

3. The apparatus of claim 1 wherein the circuit further comprises an electronic display for presenting the identified sensory material.

4. The apparatus of claim 1 wherein the circuit further comprises a means for emitting a fragrance for presenting the identified sensory material.

5. The apparatus of claim 1 wherein the circuit identifies an absence of sensory material to be presented in response to the memory and to respective second switch operation.

6. The apparatus of claim 1 wherein the circuit further comprises a means for identifying at random sensory material to be presented in response to the memory and to respective second switch operation.

7. The apparatus of claim 1 wherein the circuit further comprises a counter having a count for identifying sensory material in response to the count, the memory, and to respective second switch operation.

8. The apparatus of claim 1 wherein the circuit further comprises a counter having a count for identifying sensory material to be repeatedly presented in response to the count, the memory, and to repeated respective second switch operation.

9. The apparatus of claim 1 wherein the apparatus further comprises a cover comprising the first switch.

10. The apparatus of claim 9 wherein the first switch is located on an inner surface of the cover.

11. An apparatus for presenting combined visual and sensory material comprising:
    a. a plurality of leaves bound together each at a respective edge to form a binding, each leaf comprising:
       (1) visual material;
       (2) a respective switch formed within the leaf and associated with the visual material; and
       (3) a respective conductor formed within the leaf and extending from the respective switch to a position proximate to the respective edge;
    b. a circuit comprising a memory, the circuit for identifying sensory material in response to the memory, the memory responsive to operation of a respective switch; and
    c. a plurality of inter-leaf conductive paths through the binding for coupling each respective switch to the circuit, the circuit for presenting identified sensory material in further response to operation of any respective switch.

12. The apparatus of claim 11 wherein the circuit further comprises a speaker for presenting the identified sensory material.

13. The apparatus of claim 11 wherein the circuit further comprises an electronic display for presenting the identified sensory material.

14. The apparatus of claim 11 wherein the circuit further comprises a means for emitting a fragrance for presenting the identified sensory material.

15. The apparatus of claim 11 wherein the circuit identifies an absence of sensory material to be presented in response to the memory and to respective switch operation.

16. The apparatus of claim 11 wherein the circuit further comprises a means for identifying at random sensory material to be presented in response to the memory and to respective switch operation.

17. The apparatus of claim 11 wherein the circuit further comprises a counter having a count for identifying sensory material in response to the count, the memory, and to respective switch operation.

18. The apparatus of claim 11 wherein the circuit further comprises a counter having a count for identifying sensory material to be repeatedly presented in response to the count, the memory, and to repeated respective switch operation.

* * * * *